United States Patent
Inoda et al.

(10) Patent No.: US 12,306,456 B2
(45) Date of Patent: May 20, 2025

(54) OPTICAL ASSEMBLY FOR THREE-DIMENSIONAL MEASUREMENT DEVICE AND THREE-DIMENSIONAL MEASUREMENT DEVICE EQUIPPED WITH SAME

(71) Applicant: OMRON Corporation, Kyoto (JP)

(72) Inventors: Takeshi Inoda, Kyoto (JP); Tomonori Ariyoshi, Kyoto (JP); Hitoshi Nakatsuka, Kyoto (JP); Motoharu Okuno, Kyoto (JP); Shinya Matsumoto, Kyoto (JP); Jun Ota, Kyoto (JP); Tetsuya Kiguchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 618 days.

(21) Appl. No.: 17/635,383

(22) PCT Filed: Aug. 28, 2020

(86) PCT No.: PCT/JP2020/032561
§ 371 (c)(1),
(2) Date: Feb. 15, 2022

(87) PCT Pub. No.: WO2021/044960
PCT Pub. Date: Mar. 11, 2021

(65) Prior Publication Data
US 2022/0397739 A1    Dec. 15, 2022

(30) Foreign Application Priority Data
Sep. 5, 2019 (JP) .................................. 2019-162342

(51) Int. Cl.
*G01B 11/25* (2006.01)
*G02B 7/02* (2021.01)

(52) U.S. Cl.
CPC ............ *G02B 7/028* (2013.01); *G01B 11/254* (2013.01)

(58) Field of Classification Search
CPC .... G02B 7/028; G01B 11/254; G01B 5/0014; G01B 11/2513; G03B 17/54; G03B 17/55; H04N 23/52; H04N 23/55; H04N 23/57
See application file for complete search history.

(56) References Cited

U.S. PATENT DOCUMENTS 5,883,704 A * 3/1999 Nishi .................. G03F 7/70883
355/53
7,030,925 B1 * 4/2006 Tsunekawa ............ H04N 23/63
348/333.01
(Continued)

FOREIGN PATENT DOCUMENTS

EP    3404359      11/2018
JP    H10160841     6/1998
(Continued)

OTHER PUBLICATIONS

"International Search Report (Form PCT/ISA/210) of PCT/JP2020/032561," mailed on Nov. 17, 2020, with English translation thereof, pp. 1-4.
(Continued)

*Primary Examiner* — Balram T Parbadia
*Assistant Examiner* — John Curtis Sipes
(74) *Attorney, Agent, or Firm* — JCIPRNET

(57) ABSTRACT

An optical assembly (13) for a three-dimensional measurement device is equipped with: an optical lens (320) that forms a pair of conjugate planes having an optically conjugate relationship; an optical device (341) that is disposed on one of the pair of conjugate planes; a temperature sensor (354) for detecting the temperature of the optical lens (320); a heater (350) for heating the optical lens (320); and a
(Continued)

control part that controls the operation of the heater (350) on the basis of the result of the detection made by the temperature sensor (354) such that the optical lens (320) reaches a constant temperature.

10 Claims, 15 Drawing Sheets

(56) References Cited

U.S. PATENT DOCUMENTS

| | | | | |
|---|---|---|---|---|
| 2004/0223074 | A1 | 11/2004 | Takada | |
| 2008/0123074 | A1* | 5/2008 | Fujishima | G03F 7/70341 355/71 |
| 2011/0121340 | A1* | 5/2011 | Seo | H01L 33/56 257/98 |
| 2013/0334418 | A1* | 12/2013 | Cowie | G01N 33/0009 372/38.1 |
| 2014/0327892 | A1* | 11/2014 | Walter | G03F 7/70891 355/30 |
| 2016/0356484 | A1 | 12/2016 | Sawyer et al. | |
| 2017/0090076 | A1 | 3/2017 | Nunnink et al. | |
| 2019/0137724 | A1* | 5/2019 | Kim | G02B 7/02 |
| 2019/0163214 | A1 | 5/2019 | Haven et al. | |
| 2020/0310013 | A1* | 10/2020 | Gruver | G05D 1/0246 |
| 2021/0322684 | A1* | 10/2021 | Fischer | A61B 1/128 |

FOREIGN PATENT DOCUMENTS

| | | |
|---|---|---|
| JP | 2012079294 | 4/2012 |
| JP | 2015111101 | 6/2015 |
| JP | 6061464 | 1/2017 |
| JP | 2017167504 | 9/2017 |

OTHER PUBLICATIONS

"Written Opinion of the International Searching Authority (Form PCT/ISA/237) of PCT/JP2020/032561," mailed on Nov. 17, 2020, with English translation thereof, pp. 1-8.

"Search Report of Europe Counterpart Application", issued on Jul. 28, 2023, pp. 1-7.

* cited by examiner

OPTICAL ASSEMBLY FOR THREE-DIMENSIONAL MEASUREMENT DEVICE AND THREE-DIMENSIONAL MEASUREMENT DEVICE EQUIPPED WITH SAME

CROSS-REFERENCE TO RELATED APPLICATION

This application is a 371 application of the International PCT application serial no. PCT/JP2020/032561, filed on Aug. 28, 2020, which claims the priority benefits of Japan Patent Application No. 2019-162342, filed on Sep. 5, 2019. The entirety of each of the above-mentioned patent applications is hereby incorporated by reference herein and made a part of this specification.

TECHNICAL FIELD

The present disclosure relates to a three-dimensional measurement device that projects pattern lighting to a subject to be measured and images the projection pattern projected on the subject to measure the three-dimensional shape of the subject using the obtained image, and an optical assembly for a three-dimensional measurement device provided in the three-dimensional measurement device to serve as a projection part or an imaging part.

BACKGROUND ART

A technique of the related art to measure a three-dimensional shape of a subject using an optical method is known. For example, Japanese Patent Laid-Open No. 2012-79294 (Patent Literature 1) discloses an image information processing device that uses a projection pattern obtained by allocating symbols that are different depending on each type of codes to each code of a projection code sequence in which multiple types of codes are two-dimensionally arranged to project the projection pattern on a subject, and then uses an image obtained by image-capturing the pattern to perform three-dimensional measurement for the subject.

In addition, documents that disclose a specific structure of a camera that functions as an imaging part available for such types of three-dimensional measurement device include, for example, the specification of U.S. Patent Application Publication No. 2017/0090076 (Patent Literature 2).

CITATION LIST

Patent Literature

[Patent Literature 1]
Japanese Patent Laid-Open No. 2012-79294
[Patent Literature 2]
U.S. Patent Application Publication No. 2017/0090076

SUMMARY OF INVENTION

Technical Problem

A light projection lens and a light receiving lens used in a three-dimensional measurement device (here, each of the light projection lens and the light receiving lens may be configured as a group lens composed of multiple lenses or may be configured as a single lens) generally have the property that their focus positions change according to a temperature (which may be referred to simply as a "temperature characteristic" below). The temperature characteristics of the light projection lens and the light receiving lens significantly affect the size of the measurement range in which a three-dimensional shape of a subject can be measured (i.e., the range of a distance between the measurement head that enables the measurement and the subject).

For this reason, in order to secure a large measurement range by preventing the measurement range from becoming extremely narrow or the measurement range from not existing at all within a specified temperature range, any measure needs to be taken.

Therefore, the present disclosure takes the above-described problem into consideration and aims to provide a three-dimensional measurement device that can secure a large measurement range within a specified temperature range and an optical assembly for a three-dimensional measurement device provided therein.

Solution to Problem

An optical assembly for a three-dimensional measurement device according to an aspect following the present disclosure includes an optical lens, an optical device, a temperature sensor, a heater, and a control part. The optical lens forms a pair of conjugate planes having an optically conjugate relationship, and the optical device is disposed on one of the pair of conjugate planes. The temperature sensor is for detecting a temperature of the optical lens, and the heater is for heating the optical lens. The control part controls an operation of the heater based on a detection result of the temperature sensor so that the optical lens has a constant temperature.

Because the temperature of the optical lens can be kept at the constant temperature in the above-described configuration, it is possible to substantially prevent the focus position of the optical lens from changing at the time of three-dimensional measurement. For this reason, the optical device can be maintained to be disposed at the focus position of the optical lens at all times at the time of three-dimensional measurement by configuring such that the optical device is disposed at the focus position of the optical lens in a pre-heated state. Therefore, by employing this configuration, a wide measurement range can be secured within a specified temperature range if the three-dimensional measurement device is equipped with the optical assembly for a three-dimensional measurement device configured as described above.

The optical assembly for a three-dimensional measurement device according to the aspect following the present disclosure may further include a lens support part that surrounds the optical lens in a direction orthogonal to an optical axis of the optical lens to support the optical lens, and in this case, the temperature sensor and the heater are assembled to the lens support part.

Because the optical lens can be kept at the constant temperature via the lens support part in the above-described configuration and a temperature of the lens support part that supports the optical lens can be kept at a constant temperature, it is possible to substantially prevent an inter-element distance that is a distance between the optical lens and the optical device in the optical axis direction from fluctuating at the time of three-dimensional measurement. Thus, the optical device can be more reliably maintained to be disposed at the focus position of the optical lens at all times at the time of three-dimensional measurement.

The optical assembly for a three-dimensional measurement device according to the aspect following the present disclosure may further include a cover member that surrounds the lens support part and covers the temperature sensor and the heater, and in this case, a thermal conductivity of the cover member is equal to or lower than a thermal conductivity of the lens support part.

Because the cover member exhibits insulation effects with the above-described configuration, the optical lens and the lens support part can be heated efficiently, and temperatures of the optical lens and the lens support part can be kept at constant temperatures stably. Thus, the time required for the warm-up operation in the initial stage can be shortened, and the optical device can be more reliably maintained to be disposed at the focus position of the optical lens at all times at the time of three-dimensional measurement.

In the optical assembly for a three-dimensional measurement device according to the aspect following the present disclosure, the lens support part may have a lens barrel that supports the optical lens and a mount member to which the lens barrel is fixed, and in this case, the cover member may have a substantially sealed structure in which the mount member is concealed.

Because the insulation effects of the cover member improve with the above-described configuration, the optical lens and the lens support part can be heated more efficiently, and temperatures of the optical lens and the lens support part can be kept at constant temperatures more stably.

The optical assembly for a three-dimensional measurement device according to the aspect following the present disclosure may have an air layer in at least a portion between the cover member and the mount member.

Because not only the cover member but also the air layer exhibit insulation effects with the above-described configuration, the optical lens and the lens support part can be heated more efficiently, and temperatures of the optical lens and the lens support part can be kept at constant temperatures more stably.

The optical assembly for a three-dimensional measurement device according to the aspect following the present disclosure may further include a base part to which the lens support part is fixed, and in this case, a thermal conductivity of the base part is equal to or lower than the thermal conductivity of the lens support part.

Because the base part to which the lens support part is fixed exhibits insulation effects with the above-described configuration, the optical lens and the lens support part can be heated efficiently, and temperatures of the optical lens and the lens support part can be kept at constant temperatures stably. Thus, the time required for the warm-up operation in the initial stage can be shortened, and the optical device can be more reliably maintained to be disposed at the focus position of the optical lens at all times at the time of three-dimensional measurement.

In the optical assembly for a three-dimensional measurement device according to the aspect following the present disclosure, the heater is configured as a flexible heater composed of a flexible board on which a heating wire is provided, and preferably in this case, the temperature sensor is mounted on the flexible board, and the flexible heater is disposed on an outer circumferential surface of the lens support part.

With the above-described configuration, the optical lens and the lens support part can be heated with a simple configuration, a temperature of the optical lens can be measured with a simple configuration, thus assembly work becomes easier, and as a result, production costs can be reduced.

In the optical assembly for a three-dimensional measurement device according to the aspect following the present disclosure, the flexible heater may be attached to the lens support part using an adhesive tape having a high thermal conductivity.

With this configuration, the flexible heater can be easily assembled to the lens support part while increasing thermal transfer efficiency, the temperature sensor can be easily assembled to the lens support part while more accurate temperatures can be measured, and thus production costs can be further reduced.

In the optical assembly for a three-dimensional measurement device according to the aspect following the present disclosure, the optical device may be composed of a pattern lighting forming element that forms pattern lighting, and the optical lens may be composed of a light projection lens for forming an image of a projection pattern by projecting the pattern lighting onto a subject disposed on the other of the pair of conjugate planes.

By employing the above-described configuration, the optical assembly for a three-dimensional measurement device can be used as a projection part of a three-dimensional measurement device, and a wide measurement range can be secured within a specified temperature range with the three-dimensional measurement device including the projection part.

In the optical assembly for a three-dimensional measurement device according to the aspect following the present disclosure, the constant temperature is preferably a temperature equal to or higher than a highest temperature that the light projection lens is able to reach when the heater does not heat the light projection lens within a range of a surrounding environment temperature in which use of the optical assembly for a three-dimensional measurement device is allowed and lower than or equal to an upper limit of an operation-guaranteed temperature of the pattern lighting forming element.

By configuring as described above, an optical assembly for a three-dimensional measurement device with a long life and high reliability can be provided while securing a wide measurement range within a specified temperature range.

In the optical assembly for a three-dimensional measurement device according to the aspect following the present disclosure, the optical device may be composed of an image sensor that has a focal plane, and the optical lens may be composed of a light receiving lens for forming, on the focal plane, an image of a projection pattern projected onto a subject disposed on the other of the pair of conjugate planes.

By employing the above-described configuration, the optical assembly for a three-dimensional measurement device can be used as an imaging part of a three-dimensional measurement device, and a wide measurement range can be secured within a specified temperature range with the three-dimensional measurement device including the imaging part.

In the optical assembly for a three-dimensional measurement device according to the aspect following the present disclosure, the constant temperature is preferably a temperature equal to or higher than a highest temperature that the light receiving lens is able to reach when the heater does not heat the light receiving lens within a range of a surrounding environment temperature in which use of the optical assembly for a three-dimensional measurement device is allowed and lower than or equal to an upper limit of an operation-guaranteed temperature of the image sensor.

By configuring as described above, an optical assembly for a three-dimensional measurement device with a long life and high reliability can be provided while securing a wide measurement range within a specified temperature range.

A three-dimensional measurement device according to an aspect following the present disclosure includes, as a projection part, the optical assembly for a three-dimensional measurement device according to the above-described aspect following the present disclosure, and includes, as an imaging part, the optical assembly for a three-dimensional measurement device according to the above-described aspect following the present disclosure.

By configuring as described above, a three-dimensional measurement device that can secure a wide measurement range within a specified temperature range can be provided.

Advantageous Effects of Invention

According to the present disclosure, a three-dimensional measurement device that can secure a large measurement range within a specified temperature range and an optical assembly for a three-dimensional measurement device provided therein can be provided.

DESCRIPTION OF EMBODIMENTS

Figure 1:
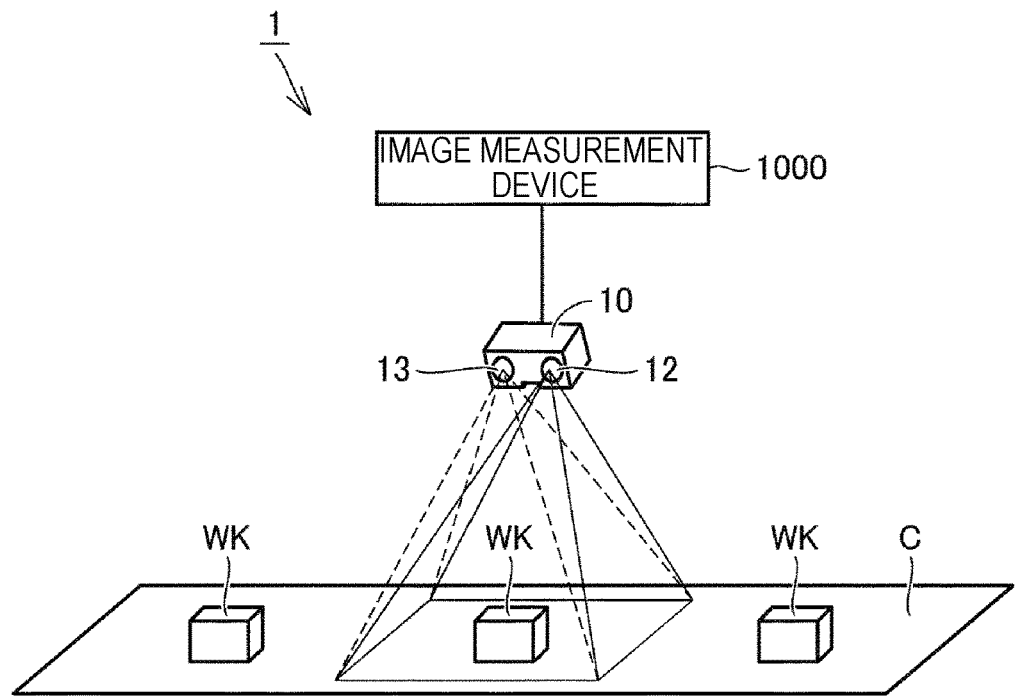
FIG. 1 is a schematic diagram of a three-dimensional measurement device according to an embodiment.

Embodiments will be described below in detail with reference to the drawings. Further, the same reference numerals will be given to the same or equivalent parts in the drawing, and description thereof will not be repeated in the embodiments introduced below.

A. Three-Dimensional Measurement Device

FIG. 1 is a schematic diagram of a three-dimensional measurement device according to an embodiment. First, the three-dimensional measurement device 1 according to the present embodiment will be described with reference to FIG. 1.

The three-dimensional measurement device 1 includes a measurement head 10 and an image measurement device 1000 as illustrated in FIG. 1. Among these, the image measurement device 1000 is called a sensor controller or a visual sensor.

The image measurement device 1000 acquires an image (which will also be referred to as an "input image" below) obtained by the measurement head 10 capturing a subject to be measured when the measurement head 10 projects a predetermined projection pattern onto the subject. Typically, a projection pattern in accordance with structured lighting is employed as a projection pattern. In other words, as the projection pattern, a pattern in which multiple types of standard patterns to which unique codes have been allocated are arranged following predetermined rules is employed (this type of method is called a unique code method).

The image measurement device 1000 performs a three-dimensional measurement process using information of the projection pattern and information of a projection pattern appearing in the acquired input image to acquire a three-dimensional measurement result (a three-dimensional measurement result image).

More specifically, the image measurement device 1000 searches the input image for each reference pattern (which will also be referred to as a "primitive") included in the projected projection pattern to acquire the position at which each primitive has been radiated and a set of codes indicated by the radiated primitives. Furthermore, the image measurement device 1000 searches the set of codes for a correspondence region (which will also be referred to as a "grid code pattern" below) indicating the same array as that of codes indicated by a predetermined number of reference patterns included in a unit region (which will also be referred to as a "word" below) set in the projection pattern. Finally, the image measurement device 1000 calculates the distance from a radiation reference plane of the projection pattern, which will be described below, to each part of the subject based on the search result of the grid code pattern. A set of the calculated distances is expressed as a three-dimensional measurement result image.

Although the three-dimensional measurement device 1 is used for various applications, it is used for the application to measurement of three-dimensional shapes of workpieces WK transported on a conveyor C and the surroundings in this example. Specifically, a projection pattern is projected from a projection part 12 provided in the measurement head 10 to workpieces WK as subjects and the surroundings, and an imaging part 13 provided in the measurement head 10 captures the workpieces WK and the surroundings with the projection pattern projected.

B. Measurement Head

Figure 2:
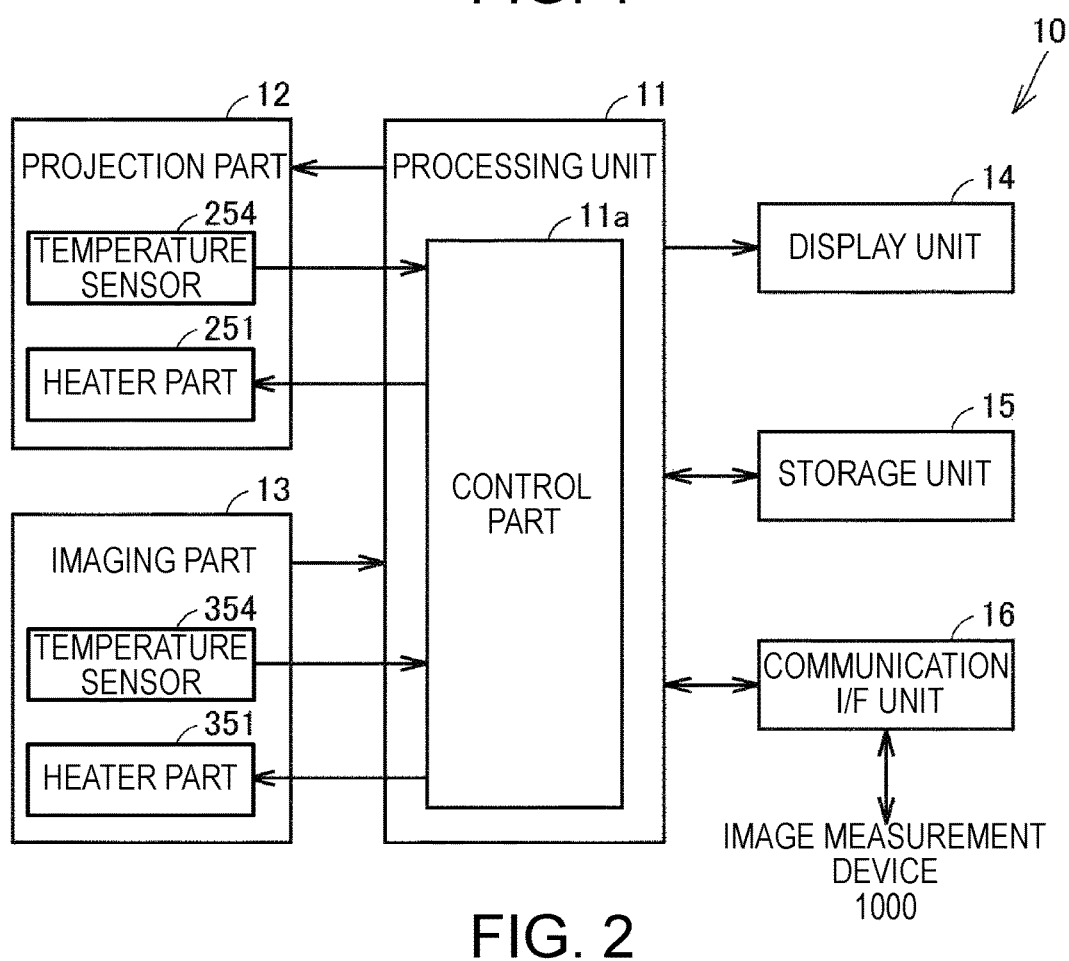
FIG. 2 is a schematic diagram illustrating a configuration of functional blocks of the measurement head illustrated in FIG. 1.
Figure 3:
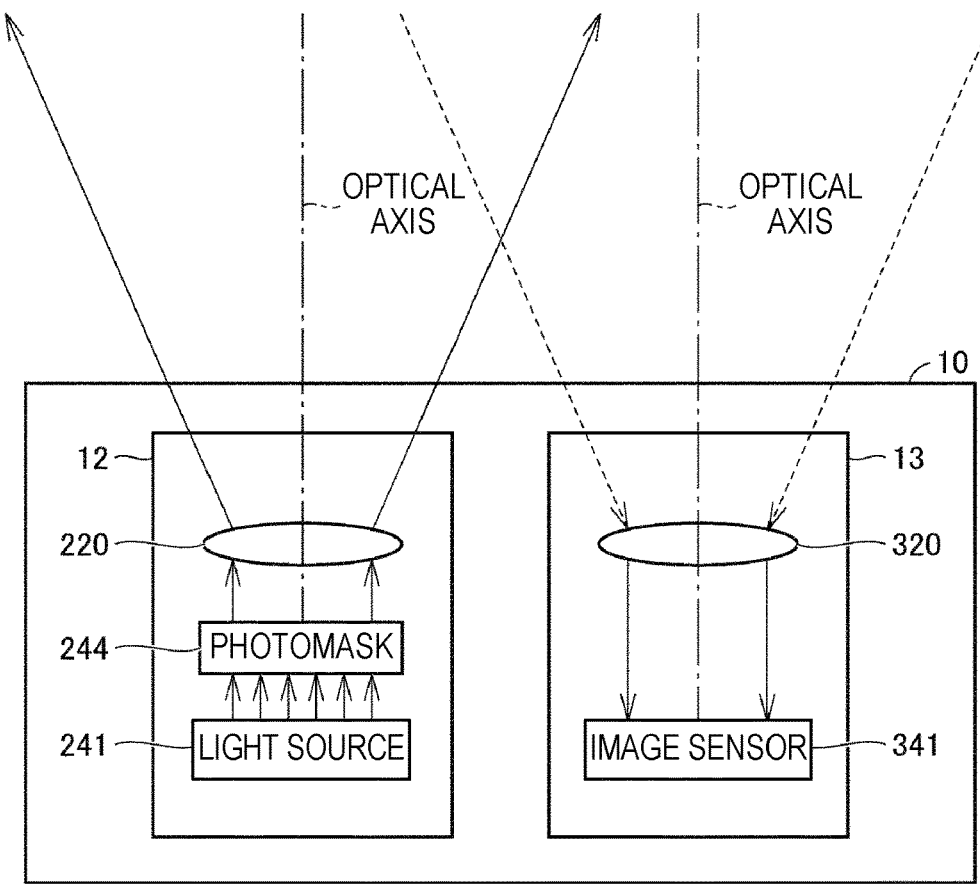
FIG. 3 is a schematic diagram illustrating the concept of a specific structure of the measurement head illustrated in FIG. 1.

FIG. 2 is a schematic diagram illustrating a configuration of functional blocks of the measurement head illustrated in FIG. 1, and FIG. 3 is a schematic diagram illustrating the concept of a specific structure of the measurement head illustrated in FIG. 1. Next, a configuration of the measurement head 10 will be described with reference to FIGS. 2 and 3.

The measurement head 10 includes a processing unit 11, the above-mentioned projection part 12 and imaging part 13, a display unit 14, a storage unit 15, and a communication interface (I/F) unit 16 as illustrated in FIG. 2. Among these, the projection part 12 projects a projection pattern on a subject, and the imaging part 13 captures the subject with the projection pattern projected as described above.

The processing unit 11 performs overall processes of the measurement head 10. The processing unit 11 typically includes a processor, a storage that stores command codes executed by the processor, and a memory that loads the command codes. In this case, the processing unit 11 realizes various kinds of processes by the processor loading a command code on the memory for execution. All or part of the processing unit 11 may be implemented using a dedicated hardware circuit (e.g., an application specific integrated circuit (ASIC) or a field-programmable gate array (FPGA)).

The display unit 14 notifies the outside of various kinds of information acquired or calculated by the measurement head 10.

The storage unit 15 stores images captured by the imaging part 13, preset calibration parameters, and the like.

The communication interface unit 16 deals with exchange of data between the measurement head 10 and the image measurement device 1000.

The projection part 12 includes a light source 241 and a photomask 244 that are pattern lighting forming elements serving as an optical device, a light projection lens 220 as an optical lens, a lens support part that is not illustrated but will be described below, and the like, as illustrated in FIG. 3. In other words, the projection part 12 is configured as an optical assembly for a three-dimensional measurement device formed by assembling the light source 241, the photomask 244, the light projection lens 220, the lens support part, and the like, and a detailed structure thereof will be described below.

The light source 241 radiates light having a predetermined wavelength toward the photomask 244. A predetermined pattern is formed on the photomask 244. Light that has passed through the photomask 244 is radiated to the outside via the light projection lens 220. Accordingly, a projection pattern is radiated to the external space.

Meanwhile, the imaging part 13 includes an image sensor 341 as an optical device, a light receiving lens 320 as an optical lens, a lens support part that is not illustrated but will be described below, and the like. In other words, the imaging part 13 is configured as an optical assembly for a three-dimensional measurement device formed by assembling the image sensor 341, the light receiving lens 320, the lens support part, and the like, and a detailed structure thereof will be described below.

The imaging part 13 captures a subject with a projection pattern projected.

Specifically, light that has passed through the light receiving lens 320 is received by the image sensor 341, and thus an input image is obtained.

Here, the projection part 12 includes a temperature sensor 254 for detecting a temperature of the light projection lens 220, and the imaging part 13 includes a temperature sensor 354 for detecting a temperature of the light receiving lens 320, as illustrated in FIG. 2.

In addition, the projection part 12 includes a heater part 251 of a flexible heater 250 (see FIG. 11, etc.) that is a heater to heat the light projection lens 220, and the imaging part 13 includes a heater part 351 of a flexible heater 350 (see FIG. 14, etc.) that is a heater to heat the light receiving lens 320.

Meanwhile, the processing unit 11 includes a control part 11a. The control part 11a performs control to keep the temperatures of the light projection lens 220 and the light receiving lens 320 at predetermined constant temperatures, respectively, at the time of three-dimensional measurement.

Specifically, the control part 11a causes the temperatures of the light projection lens 220 to be kept at the constant temperature by controlling operations of the heater part 251 based on a detection result of the temperature sensor 254 and the temperatures of the light receiving lens 320 to be kept at the constant temperature by controlling operations of the heater part 351 based on a detection result of the temperature sensor 354. Further, this point will be described below in detail.

C. Image Measurement Device

Figure 4:
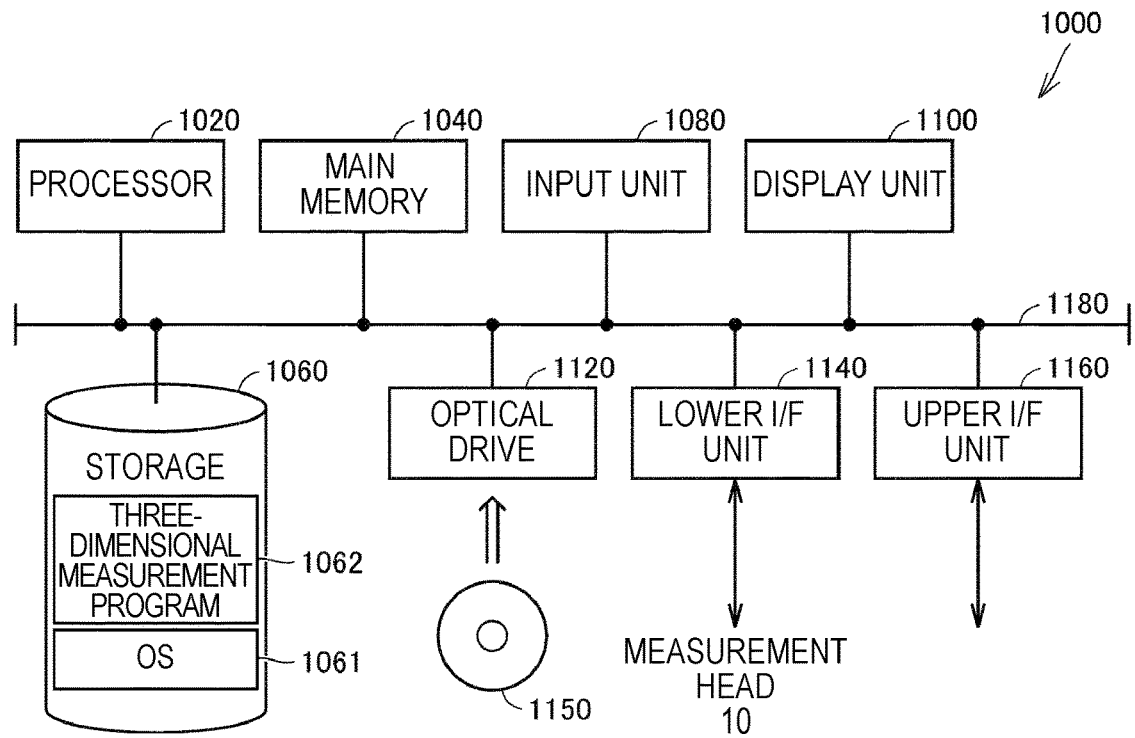
FIG. 4 is a schematic diagram illustrating a configuration of functional blocks of the image measurement device illustrated in FIG. 1.

FIG. 4 is a schematic diagram illustrating a configuration of functional blocks of the image measurement device illustrated in FIG. 1. Next, a configuration of the functional blocks of the image measurement device 1000 will be described with reference to FIG. 4.

The image measurement device 1000 is typically realized using a general-purpose computer as illustrated in FIG. 4. The image measurement device 1000 includes a processor 1020, a main memory 1040, a storage 1060, an input unit 1080, a display unit 1100, an optical drive 1120, a lower interface unit 1140, and an upper interface unit 1160. These components are connected by a processor bus 1180.

The processor 1020 is configured by a central processing unit (CPU), a graphics processing unit (GPU), or the like, and realizes various kinds of processing, which will be described below, by reading a program stored in the storage 1060 (an OS 1061 and a three-dimensional measurement program 1062 as examples) and loading and performing the program in the main memory 1040.

The main memory 1040 is configured by a volatile storage device such as a dynamic random access memory (DRAM) or a static random access memory (SRAM), or the like. The storage 1060 is configured by a non-volatile storage device, for example, a hard disk drive (HDD), a solid state drive (SSD), or the like.

The storage 1060 stores the three-dimensional measurement program 1062 for providing functions of the image measurement device 1000, in addition to the OS 1061 for realizing basic functions.

The input unit 1080 is configured by a keyboard, a mouse, and the like to receive user operations. The display unit 1100 is configured by a display, various indicators, a printer, or the like to output processing results, and the like from the processor 1020.

The lower interface unit 1140 deals with exchange of data with the measurement head 10. The upper interface unit 1160 deals with exchange of data with an upper device that is not illustrated (e.g., programmable computer (PLC), etc.)

The image measurement device 1000 has the optical drive 1120, and reads a program among computer-readable programs from a recording medium 1150 (e.g., an optical recording medium such as a digital versatile disc (DVD)) that non-transiently stores the programs and installs the read program in the storage 1060, or the like.

Although the three-dimensional measurement program 1062 executed by the image measurement device 1000 may be installed via the computer-readable recording medium 1150, the program may be downloaded from a server device on a network to be installed. In addition, functions provided by the three-dimensional measurement program 1062 according to the present embodiment may be realized by using some of modules provided by the OS.

Although the configuration example in which necessary functions of the image measurement device 1000 are provided by the processor 1020 executing programs has been introduced in FIG. 4, some or all of the provided functions may be implemented using a dedicated hardware circuit (e.g., an ASIC, an FPGA, or the like).

D. Three-Dimensional Measurement

Next, three-dimensional measurement by the three-dimensional measurement device 1 according to the present embodiment will be described. In the present embodiment, three-dimensional measurement is realized using a method called structured lighting. In the method of structured lighting, a three-dimensional shape of a subject is measured by measuring a position of each part of the subject (the distance from the measurement head) based on an image obtained by projecting a predetermined projection pattern on the subject and capturing the subject with the projection pattern projected.

In the present embodiment, a method of radiating measurement light with a predetermined projection pattern (typically, a gradation pattern) is employed as an example of structured lighting. Further, in the following description, a radiation plane of the projection part 12 is regarded as a "radiation reference plane" of a projection pattern.

In the three-dimensional measurement device 1, calibration is performed for the projection part 12 and the imaging part 13 included in the measurement head 10, and optical parameters of the projection part 12 and the imaging part 13 and a matrix that associates the parts are determined in advance. All of the optical parameters of the projection part 12 and the imaging part 13 are determined based on the same reference point, and if a height of the projection plane of the projection part 12 is specified, the pixel on the focal plane of the imaging part 13 corresponding to the projection pattern radiated from the projection part 12 can be calculated.

The size and position of the projection pattern radiated from the projection part 12 change according to the position and slope of a subject (expansion and contraction of an interval between adjacent elements) with respect to the optical axis of the projection part 12, and thus the shape of the subject can be measured based on the principle of triangulation based on the information of the pattern.

Figure 5:
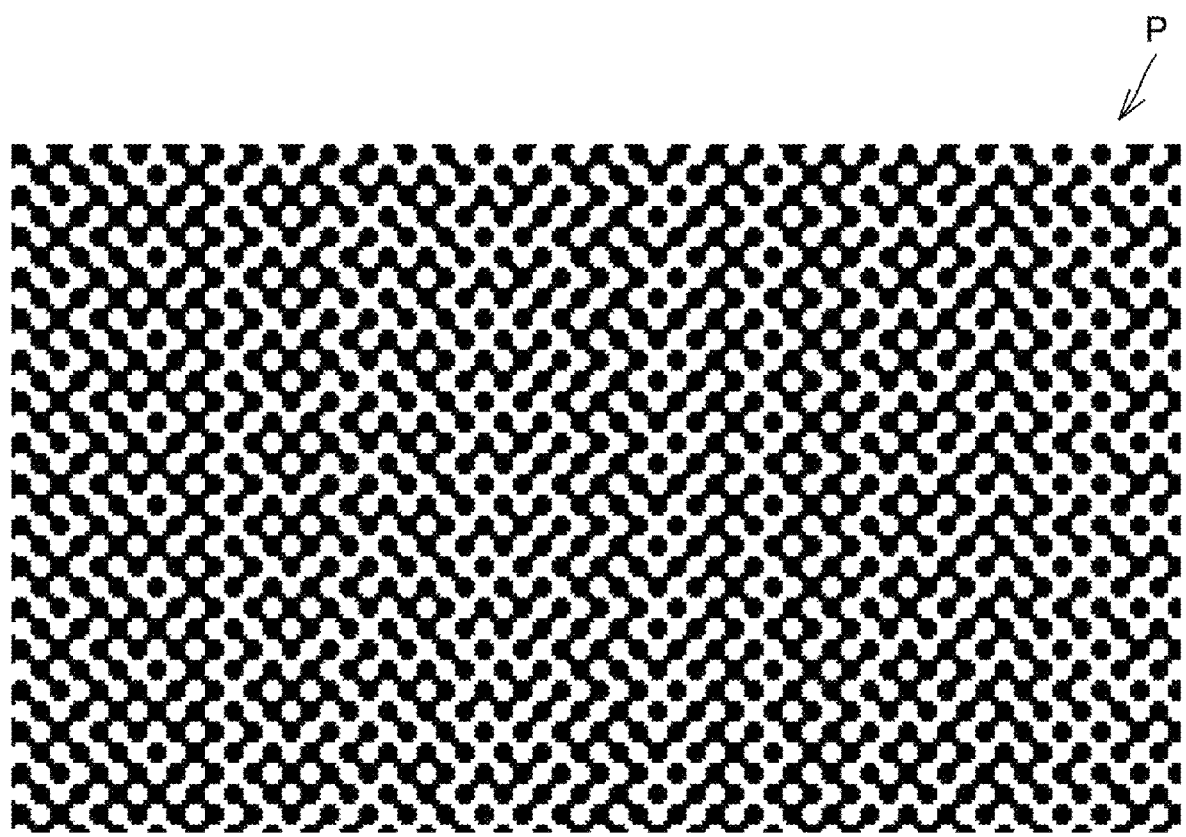
FIG. 5 is a diagram illustrating an example of a projection pattern radiated from the measurement head of the three-dimensional measurement device illustrated in FIG. 1.
Figure 6:
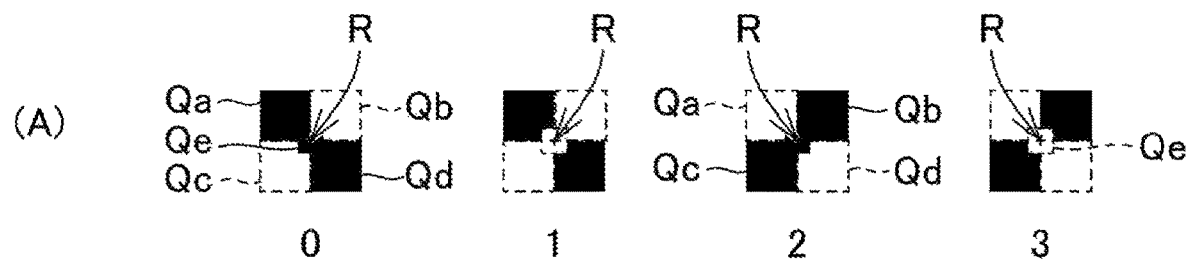
FIG. 6 is a diagram for explaining the principle of three-dimensional measurement performed by the three-dimensional measurement device illustrated in FIG. 1.
Figure 6:
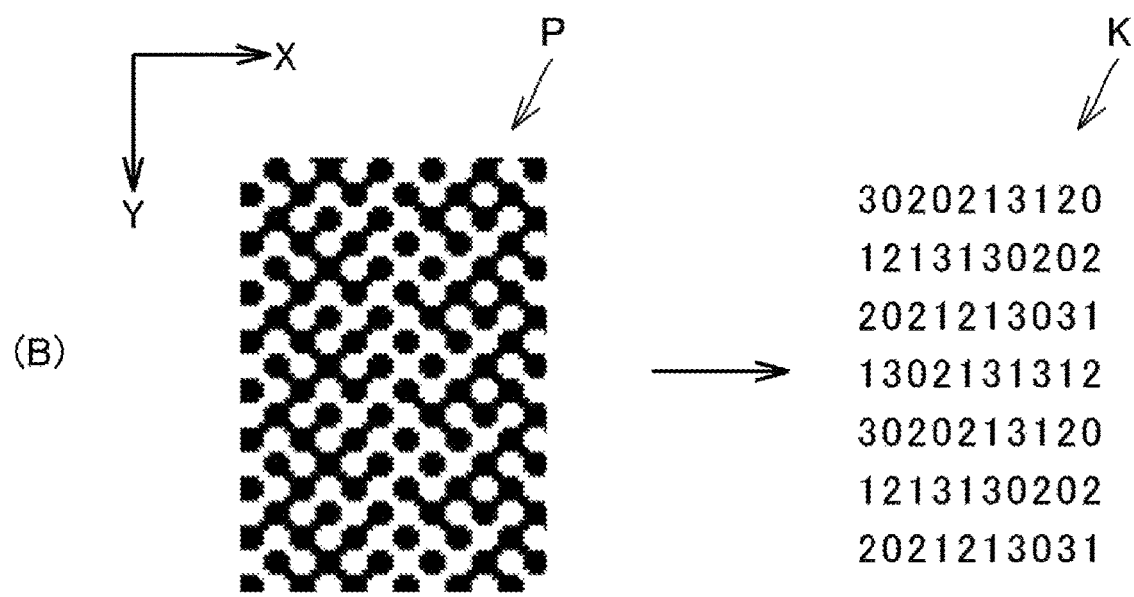
Figure 6:
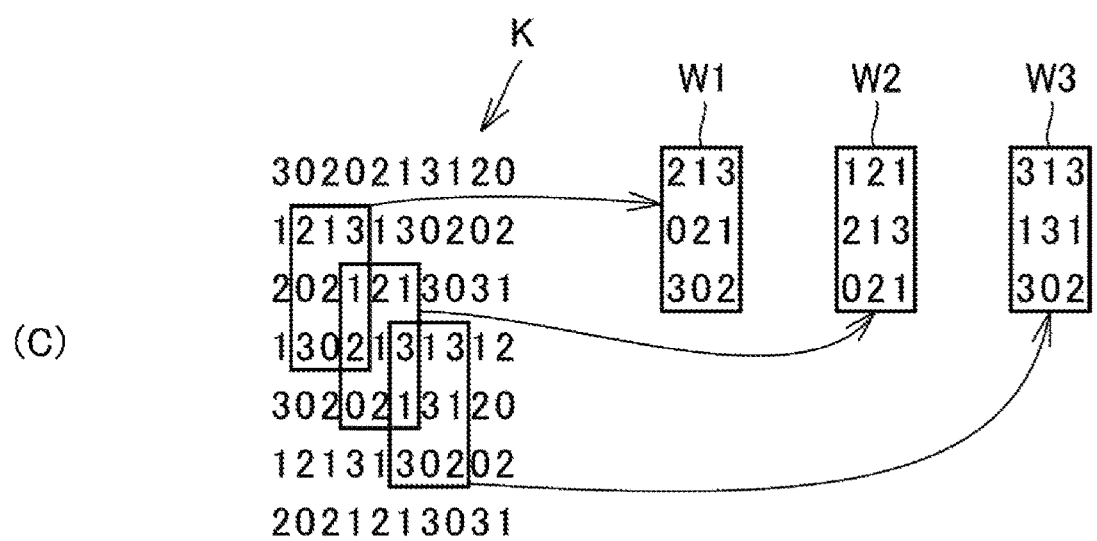

FIG. 5 is a diagram illustrating an example of a projection pattern radiated from the measurement head of the three-dimensional measurement device according to the present embodiment. FIG. 6 is a diagram for explaining the principle of three-dimensional measurement performed by the three-dimensional measurement device according to the present embodiment.

The projection part 12 of the measurement head 10 radiates, for example, measurement light including a projection pattern P as illustrated in FIG. 5 to a subject. The imaging part 13 of the measurement head 10 captures the subject with the projection pattern P projected thereon.

The projection pattern P illustrated in FIG. 5 is a pattern in which spatial codes are arranged in a grid shape (which will also be referred to as "grid-like codes" below), and unique codes that do not cause autocorrelation are allocated for a pattern with a predetermined length in a predetermined direction. More specifically, the projection pattern P is defined with a combination of multiple types of primitives (corresponding to reference patterns).

(A) of FIG. 6 illustrates four types of primitives. Each primitive indicates codes allocated to it (four numerical values from 1 to 4 in the example illustrated in (A) of FIG. 6).

Each primitive is constituted by four large squares Qa to Qd and one small square Qe located at the center part. The squares Qa to Qd are disposed such that a primitive position R is at a corner. The primitive position R may be at the center position of the small square Qe.

The intersection of the large squares Qa to Qd (the corner point of the grid) is defined as the primitive position R as illustrated in (A) of FIG. 6. Further, a size and a shape of the primitive position R are not limited. Each primitive is restored as one three-dimensional point.

The primitive position R in "white" is expressed as p0=1, the primitive position R in "black" is expressed as p0=0, the upper-left large square Qb in the primitive position R in "white" is expressed as p1=1, and the upper-left large square Qb in the primitive position R in "black" is expressed as p1=0 as illustrated in (A) of FIG. 6. The type of the primitives can be expressed numerically as 2p1+p0.

The types of the primitives included in parts of the projection pattern P (see FIG. 5) are expressed by numerical values in (B) of FIG. 6. That is, a matrix K equivalent to the projection pattern P can be generated by specifying the type of each primitive included in the projection pattern P and expressing the type of each specified primitive with numerical values.

In the following description, the in-plane directions of the projection pattern P are defined as an X direction and a Y direction, and the optical axis direction (height) is defined as a Z direction.

(C) of FIG. 6 shows a partial matrix of the matrix K shown in (B) of FIG. 6. Here, a partial matrix in a predetermined size (a word height H words×a word width W words) set to the matrix K is assumed. Such a partial matrix is also referred to as a "word". That is, each word is defined by a combination of a predetermined number of types of primitives (3×3 in the example shown in (C) of FIG. 6). The projection pattern P is generated by disposing the primitives such that each of all the words is unique.

All of the words included in the matrix K are extracted from the input image acquired by capturing the subject with the projection pattern P projected thereon. Further, the process of extracting the primitives and specifying or reconstructing the words is also referred to as "decoding" (of words).

(C) of FIG. 6 shows three extracted words (words W1, W2, and W3). When all the words have been extracted from the pattern reflected in the input image, if the sequence of the numerical values of the partial matrix in each extracted word is unique, the position of the word in the pattern can be specified. That is, the position (the position of the word) in the projection pattern P can be specified.

When the projection pattern P is radiated from the measurement head 10 (the projection part 12), the position of the word specified from the projected image changes according to the surface shape of the subject.

The distance from the measurement head 10 to each part of the subject and the three-dimensional shape of the subject can be measured based on the size of the word, which is defined from the primitives included in the image acquired by capturing the subject while the projection pattern P is radiated to the subject, and the positional deviation between adjacent words.

In the example illustrated in (C) of FIG. 6, the adjacent words W1 to W3 share some primitives, for example.

The image measurement device 1000 outputs a measurement result of the three-dimensional shape of the subject by performing the primitive extraction process and the evaluation process of the position and size of a word specified based on the extracted primitive for each image outputted from the measurement head 10.

Further, although (A) of FIG. 6 illustrates an example in which four types of primitives are used, the number of the types of primitives is not limited to four. In addition, a shape and color of the primitives are not limited to those shown in (A) of FIG. 6, and any shape and color can be employed.

Furthermore, it is possible to employ pattern matching in which each primitive is modeled, or a filtering process in which the black pixel direction/white pixel direction and the median color are used as conditions as a method for detecting primitives.

E. Problem to be Solved

Next, a problem to be solved by the present disclosure will be described. A problem to be solved by the present disclosure is, in short, to prevent a measurement range from becoming extremely narrow or the measurement range from not existing at all in a specified temperature range, as described above.

Here, the measurement range means the range of a distance from a subject to the measurement head that enables measurement of a three-dimensional shape of the subject in the optical axis direction, and the three-dimensional shape of the subject cannot be measured if the measurement range becomes extremely narrow or the measurement range does not exist at all.

The measurement range includes a measurement range on the projection part side and a measurement range on the imaging part side. When a subject is disposed outside a measurement range on the projection part side, a projection pattern projected on the subject becomes blurry, and thus the projection pattern in the input image becomes unclear. In addition, when a subject is disposed outside a measurement range on the imaging part side, an image formed on the focal plane of the image sensor becomes blurry, and thus the projection pattern in the input image becomes unclear. Thus, the above-described primitives cannot be extracted from the acquired input image in either case, and as a result, no three-dimensional shape of the subject can be measured.

The measurement head of the three-dimensional measurement device includes the optical lens (the light projection lens) for forming an image of a projection pattern on a subject and another optical lens (the light receiving lens) for forming an image of the subject with the projection pattern projected thereon on the focal plane of the image sensor. Although such optical lenses are generally configured as a composite lens in which multiple lenses are combined, they normally have the property that their focus positions change according to temperatures (temperature characteristics). The temperature characteristics of the optical lenses significantly affect the presence and size of the above-described measurement ranges.

Figure 7:
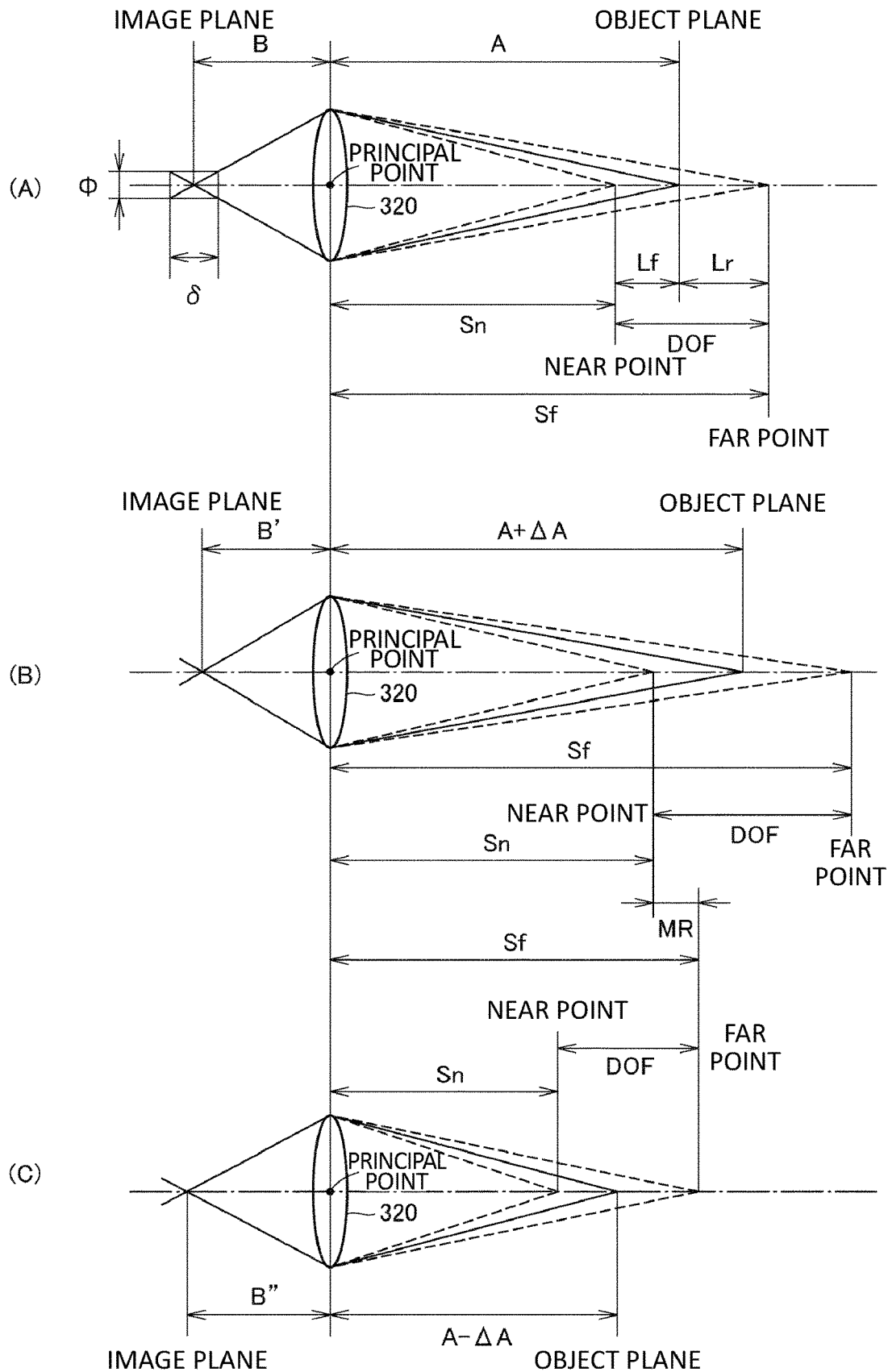
FIG. 7 is a diagram illustrating a measurement range of the three-dimensional measurement device on the imaging part side illustrated in FIG. 1.
Figure 14:
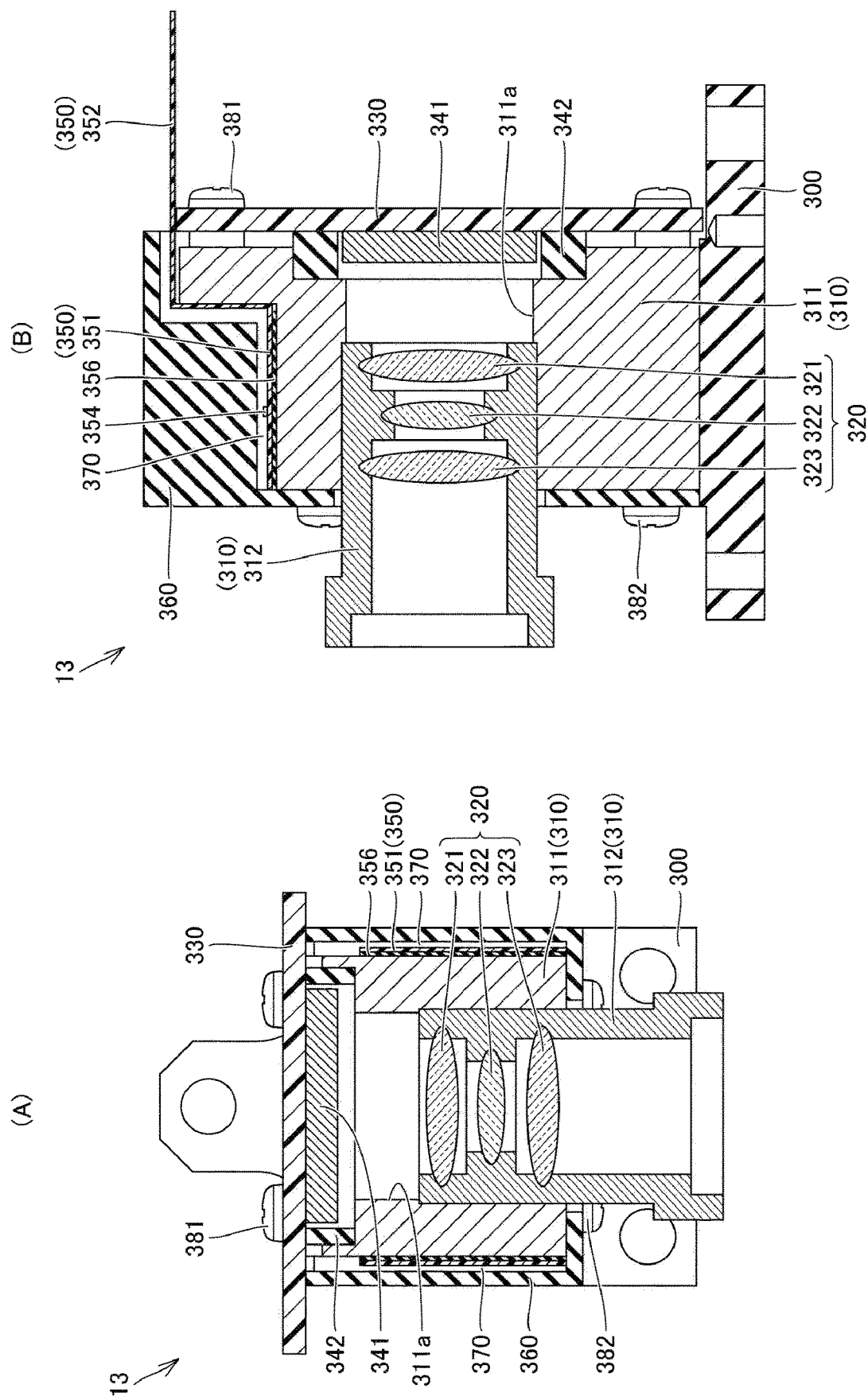
FIG. 14 is a schematic cross-sectional view of the imaging part illustrated in FIG. 9.

FIG. 7 is a diagram illustrating a measurement range of the three-dimensional measurement device on the imaging part side illustrated in FIG. 1. The influence of the temperature characteristics of the optical lenses on the measurement range of the three-dimensional measurement device 1 will be described below in detail with reference to FIG. 7 exemplifying that of the light receiving side. Note that, although a case in which the light receiving lens 320 is configured as a single lens has been illustrated in FIG. 7 in order to make it easier to understand, the light receiving lens 320 may be configured as a group lens composed of multiple lenses as illustrated in FIG. 14 and the like, which will be described below.

Here, (A) of FIG. 7 illustrates a state of the light receiving lens 320 at a temperature T, (B) of FIG. 7 illustrates a state of the light receiving lens 320 at a temperature that has increased to the temperature T+ΔT, and (C) of FIG. 7 illustrates a state of the light receiving lens 320 at a temperature that has decreased to the temperature T−ΔT. Further, as the light receiving lens 320 to be used, a lens whose focus position gets far away as the temperature increases will be exemplified.

The light receiving lens 320 forms an object plane and an image plane as a pair of conjugate planes in an optically conjugate relation as illustrated in (A) of FIG. 7. An object distance A that is a distance from the principal point of the light receiving lens 320 to the object plane and an image distance B that is a distance from the principal point of the light receiving lens 320 to the image plane are determined using the following formula (1) using a focal length f of the light receiving lens 320.

$$(1/A)+(1/B)=1/f \tag{1}$$

Here, as a subject is disposed on the object plane and the image sensor 341 is disposed on the image plane, an image of the subject is clearly formed on the focal plane of the image sensor 341. Further, the light receiving lens 320 has a focal depth δ that is determined using an allowable scattering circle diameter Φ of the lens, and as long as the image sensor 341 is disposed within the range of the focal depth δ, an image of the subject is clearly formed on the focal plane of the image sensor 341.

The measurement range on the light receiving side is determined using a depth of field (DOF). The depth of field (DOF) is a range in which an image is clearly formed on the image plane in the optical axis direction on the side on which a subject is disposed and is expressed by the sum of a front depth of field Lf positioned on the light receiving lens 320 side when viewed from the object plane and a rear depth of field Lr positioned on the side opposite to the light receiving lens 320 side when viewed from the object plane. Generally, the end point of the DOF on the light receiving lens 320 side is referred to as a "near point," and the end point of the DOF on the side opposite to the light receiving lens 320 side is referred to as a "far point."

Here, a near point distance Sn that is the distance from the principal point of the light receiving lens 320 to the near point and a far point distance Sf that is the distance from the principal point of the light receiving lens 320 to the far point are determined using the following formulas (2) and (3), respectively, using the above-described focal length f, object distance A, allowable scattering circle diameter Φ and a brightness F of the light receiving lens 320.

$$Sn=\Phi \times F \times A^2/(f^2+\Phi \times F \times A) \qquad (2)$$

$$Sf=\Phi \times F \times A^2/(f^2-\Phi \times F \times A) \qquad (3)$$

Therefore, the imaging part 13 with the distance between the image sensor 341 and the light receiving lens 320 in the optical axis direction (which will be referred to as an "inter-element distance") being the above-described image distance B can acquire a clear input image of the subject if the subject is disposed within the range of the distance from the light receiving lens 320 equal to or longer than the near point distance Sn expressed by the formula (2) and shorter than or equal to the far point distance Sf expressed by the formula (3). In other words, the range is a measurement range of the temperature T.

Meanwhile, in a state in which a temperature of the light receiving lens 320 has increased by the temperature ΔT from the state illustrated in (A) of FIG. 7, the focus position of the light receiving lens 320 moves in the direction in which the object plane gets away from the light receiving lens 320, and thus the object plane moves away from the light receiving lens 320 accordingly, as illustrated in (B) of FIG. 7. If the lengthened distance is set to ΔA, the object distance becomes A+ΔA. In this case, the near point distance Sn and the far point distance Sf are determined using the following formulas (4) and (5), respectively.

$$Sn=\Phi \times F \times (A+\Delta A)^2/(f^2+\Phi \times F \times (A+\Delta A)) \qquad (4)$$

$$Sf=\Phi \times F \times (A+\Delta A)^2/(f^2-\Phi \times F \times (A+\Delta A)) \qquad (5)$$

In other words, the measurement range at a temperature T+ΔT is shifted in the direction in which the object plane gets farther away from the light receiving lens 320 than in the measurement range at the above-described temperature T.

Further, the image plane gets closer to the light receiving lens 320 when the object plane gets away from the light receiving lens 320 as described above, the image distance at that time is denoted by B' in the drawing. Here, B' is f×(A+ΔA)/(A+ΔA−f) based on the above formula (1).

On the other hand, in a state in which a temperature of the light receiving lens 320 has decreased by the temperature ΔT from the state illustrated in (A) of FIG. 7, the focal length of the light receiving lens 320 moves in the direction in which the object plane gets closer to the light receiving lens 320, and thus the object plane moves close to the light receiving lens 320 accordingly, as illustrated in (C) of FIG. 7. If the shortened distance is set to ΔA, the object distance becomes A−ΔA. In this case, the near point distance Sn and the far point distance Sf are determined using the following formulas (6) and (7), respectively.

$$Sn=\Phi \times F \times (A-\Delta A)^2/(f^2+\Phi \times F \times (A-\Delta A)) \qquad (6)$$

$$Sf=\Phi \times F \times (A-\Delta A)^2/(f^2-\Phi \times F \times (A-\Delta A)) \qquad (7)$$

In other words, the measurement range at a temperature T−ΔT is shifted in the direction in which the object plane gets closer to the light receiving lens 320 than in the measurement range at the above-described temperature T.

Further, the image plane gets farther away from the light receiving lens 320 when the object plane gets closer to the light receiving lens 320 as described above, the image distance at that time is denoted by B" in the drawing. Here, B" is f×(A−ΔA)/(A−ΔA−f) based on the above formula (1).

As described above, if it is assumed to create a three-dimensional measurement device having a range from the temperature T−ΔT to a temperature T+ΔT as a measurement-possible temperature range, an actual measurement range of the three-dimensional measurement device is a range of a distance from the light receiving lens 320 equal to or longer than the near point distance Sn at the temperature T+ΔT expressed by the formula (4) and shorter than or equal to the far point distance Sf at the temperature T−ΔT expressed by the formula (7) (i.e., the range denoted by reference symbol MR in the drawing). That is, in order to secure the actual measurement range MR, it needs to satisfy at least the condition (the right side of the formula (4))<(the right side of the formula (7)), and in order to secure more sufficient range, the far point distance Sf at the temperature T−ΔT expressed by the formula (7) needs to be sufficiently longer than the near point distance Sn at the temperature T+ΔT expressed by the formula (4).

However, all of the focal length f, the allowable scattering circle diameter D, and brightness F are determined according to optical characteristics of the light receiving lens 320 to be used, and while the values can be finely adjusted to some degree, they are not freely set based on various constraints on the realization of three-dimensional measurement. For this reason, as a result that the present inventor has performed various estimation on the assumption of actual specifications, it has been ascertained that it is very difficult to secure a sufficiently wide measurement range MR in the above-described actual situation while satisfying the optical characteristics required for optical lenses in realizing three-dimensional measurement, and it has been found that the actual measurement range MR becomes extremely narrow or does not exist any longer.

Further, although detailed description of the situation is not be provided, even in a case in which the light receiving lens 320 changes in the direction in which the focus position gets closer as the temperature rises, the same problem as that described above occurs, and the temperature characteristics of the light projection lens 220 provided in the projection part 12 affect the measurement range of the three-dimensional measurement device 1 on the projection part 12 side for the similar reason as that of the temperature characteristics of the light receiving lens 320 that affects the measurement range of the three-dimensional measurement device 1 on the imaging part 13 side.

Thus, the present inventor has attempted to find the solution to the problem by causing the control part 11a of the three-dimensional measurement device 1 according to the present embodiment to perform control such that a temperature of the light projection lens 220 and a temperature of the light receiving lens 320 are kept at predetermined constant temperatures at the time of three-dimensional measurement. The three-dimensional measurement device 1 according to the present embodiment will be described in detail including this point.

F. Detailed Structure of Measurement Head

Figure 8:
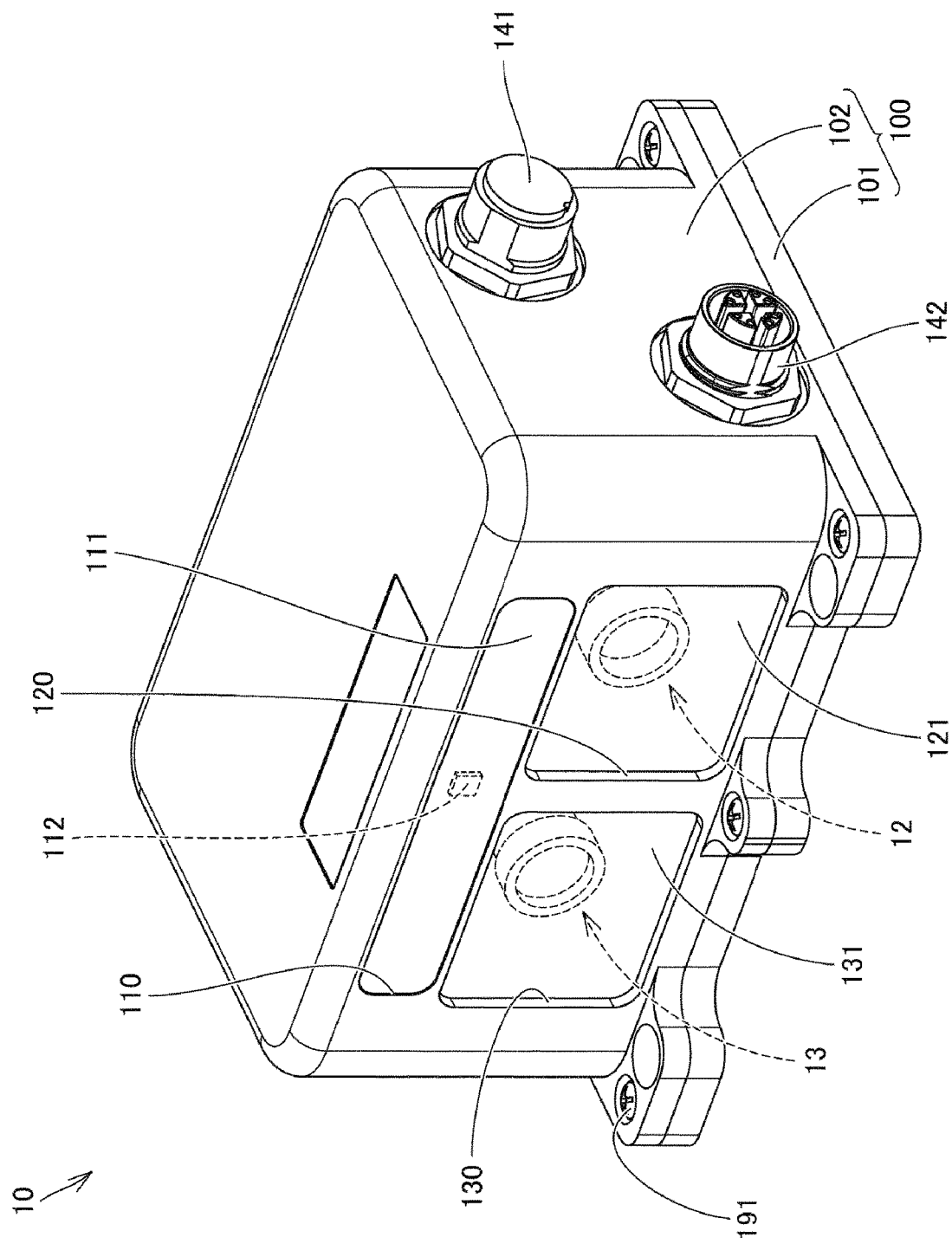
FIG. 8 is a schematic perspective view illustrating an exterior structure of the measurement head illustrated in FIG. 1.
Figure 9:
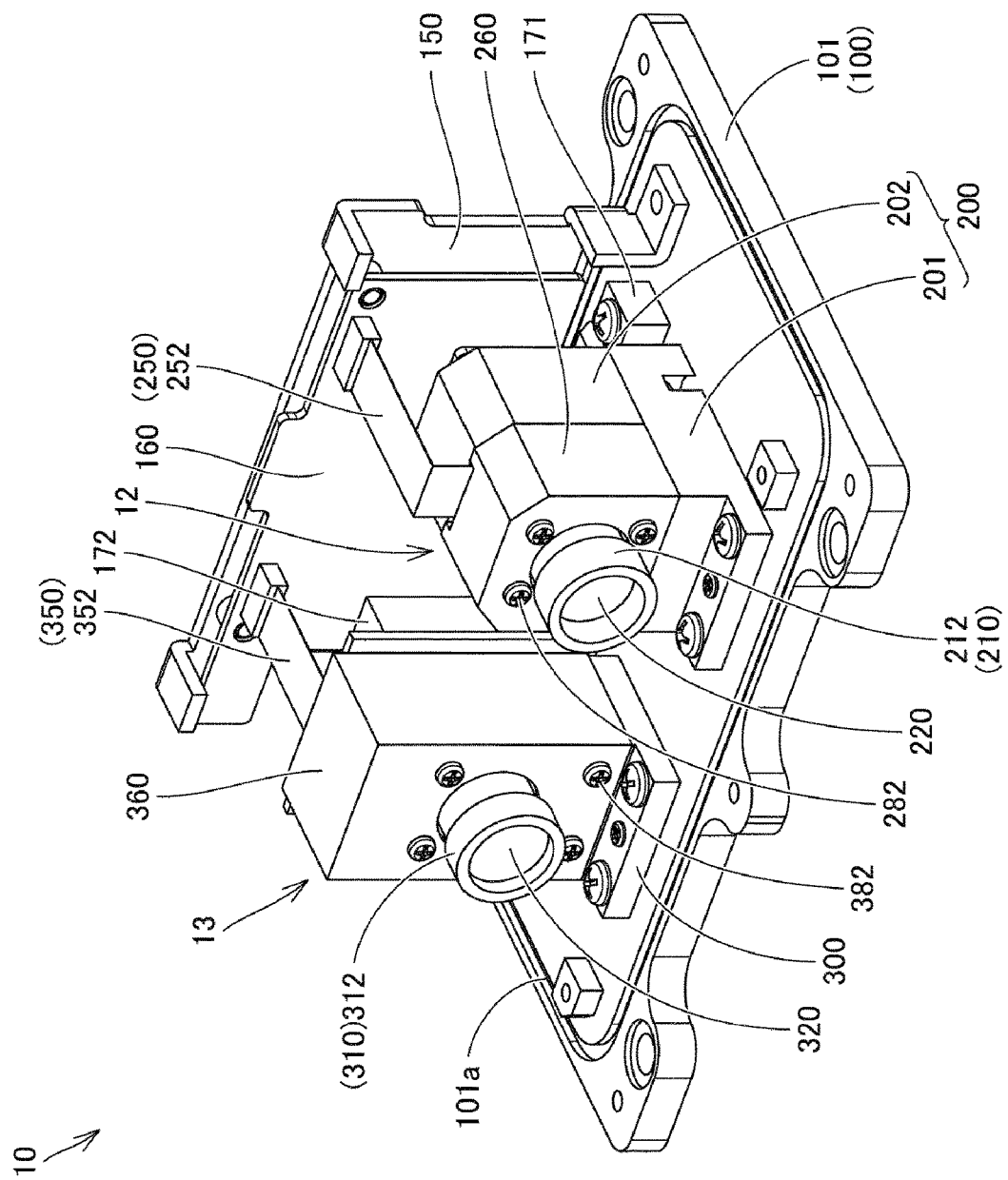
FIG. 9 is a schematic perspective view illustrating an interior structure of the measurement head illustrated in FIG. 1.

FIGS. 8 and 9 are schematic perspective views each illustrating exterior and interior structures of the measurement head illustrated in FIG. 1. First, an overall structure of the measurement head 10 according to the present embodiment will be described with reference to FIGS. 8 and 9. Further, some of internal constituent components are not illustrated in FIG. 9.

The measurement head 10 has an approximately rectangular parallelepiped shape externally, and includes a housing 100, and the projection part 12 and the imaging part 13 as an optical assembly for a three-dimensional measurement device housed in the housing 100 as illustrated in FIG. 8.

The housing 100 has a flat bottom plate 101 (see FIG. 9) and a box-shaped cover 102 with a bottom opening, and has a substantially rectangular parallelepiped shape as a whole when the bottom plate 101 blocks the bottom opening of the cover 102. The bottom plate 101 and the cover 102 are fixed with screws 191. All of the bottom plate 101 and the cover 102 are formed of a metal member having a high thermal conductivity, and preferably formed of an aluminum alloy or the like.

Three windows including a lighting window 110, a light projection window 120, and a light receiving window 130 in total are provided on the front surface of the housing 100. These lighting window 110, light projection window 120, and light receiving window 130 are covered by light transmitting plates 111, 121, and 131, respectively.

A lighting light source 112 formed of, for example, a light emitting diode (LED), or the like is disposed at a position inside the housing 100 on the rear side of the lighting window 110. Light emitted from the lighting light source 112 is transmitted through the above-described light transmitting plate 111 to be radiated to the external space from the lighting window 110, and thereby a measurement area is brightly illuminated. The lighting light source 112 is provided in consideration of a case in which no lighting facility to illuminate a measurement area is provided, and can be used as lighting in cases other than the case where the above-described three-dimensional measurement is performed.

The projection part 12 is disposed at a position inside the housing 100 on the rear side of the light projection window 120. Referring to FIG. 9, the projection part 12 is configured as an optical assembly for a three-dimensional measurement device formed by assembling the light source 241, the photomask 244, the light projection lens 220, the lens support part 210, and the like (among these, the light source 241 and the photomask 244 are not shown in FIG. 9) with each other as described above.

A lens barrel 212 that is a part of the lens support part 210 is arranged at a position on the front side of the projection part 12. The lens barrel 212 supports the light projection lens 220 therein. Thus, the light projection lens 220 is disposed to face the light transmitting plate 121 covering the above-described light projection window 120.

Light that has passed through the photomask 244 inside the projection part 12 and then emitted from the projection part 12 via the light projection lens 220 is transmitted through the above-described light transmitting plate 121 and is radiated toward the external space from the light projection window 120, and thereby a projection pattern is radiated toward the external space. When the projection pattern radiated from the projection part 12 is projected on a workpiece WK and the surroundings as described above, three-dimensional measurement is possible.

The imaging part 13 is disposed at a position inside the housing 100 on the rear side of the light receiving window 130. Referring to FIG. 9, the imaging part 13 is configured as an optical assembly for a three-dimensional measurement device formed by assembling the image sensor 341, the light receiving lens 320, the lens support part 310, and the like (among these, the image sensor 341 is not shown in FIG. 9) with each other as described above.

A lens barrel 312 that is a part of the lens support part 310 is arranged at a position on the front side of the imaging part 13. The lens barrel 312 supports the light receiving lens 320 therein. Thus, the light receiving lens 320 is disposed to face a light transmitting plate 131 covering the above-described light receiving window 130.

Reflection light emitted from the workpiece WK and the surroundings on which the projection pattern has been projected is transmitted through the above-described light transmitting plate 131 to be incident on the imaging part 13 from the light receiving window 130 and is radiated onto the image sensor 341 via the light receiving lens 320. As a result, the image sensor 341 receives the light as described above, and thus three-dimensional measurement is possible.

In addition, connection terminals 141 and 142 are provided at predetermined positions on side surfaces of the housing 100. The connection terminals 141 and 142 electrically connect the measurement head 10 and the image measurement device 1000, and the like.

A chassis 150 formed of a metal plate member is provided at a position inside the housing 100 on the rear side of the projection part 12 and the imaging part 13 as illustrated in FIG. 9. The chassis 150 is provided to stand upward from the bottom plate 101 of the housing 100, and a circuit board 160 is assembled on the front surface side of the chassis 150. Thus, the circuit board 160 is disposed to have a standing posture at a position on the front side of the chassis 150 and the rear side of the projection part 12 and the imaging part 13.

The circuit board 160 includes the above-described processing unit 11, and is electrically connected to each of the projection part 12 and the imaging part 13 via a flexible wiring board or the like, which is not illustrated. In addition, the circuit board 160 also includes the control part 11a for controlling operations of flexible heaters 250 and 350, which will be described below, and is also electrically connected to wiring parts 252 and 352 of the flexible heaters 250 and 350.

G. Structure of Projection Part

Figure 10:
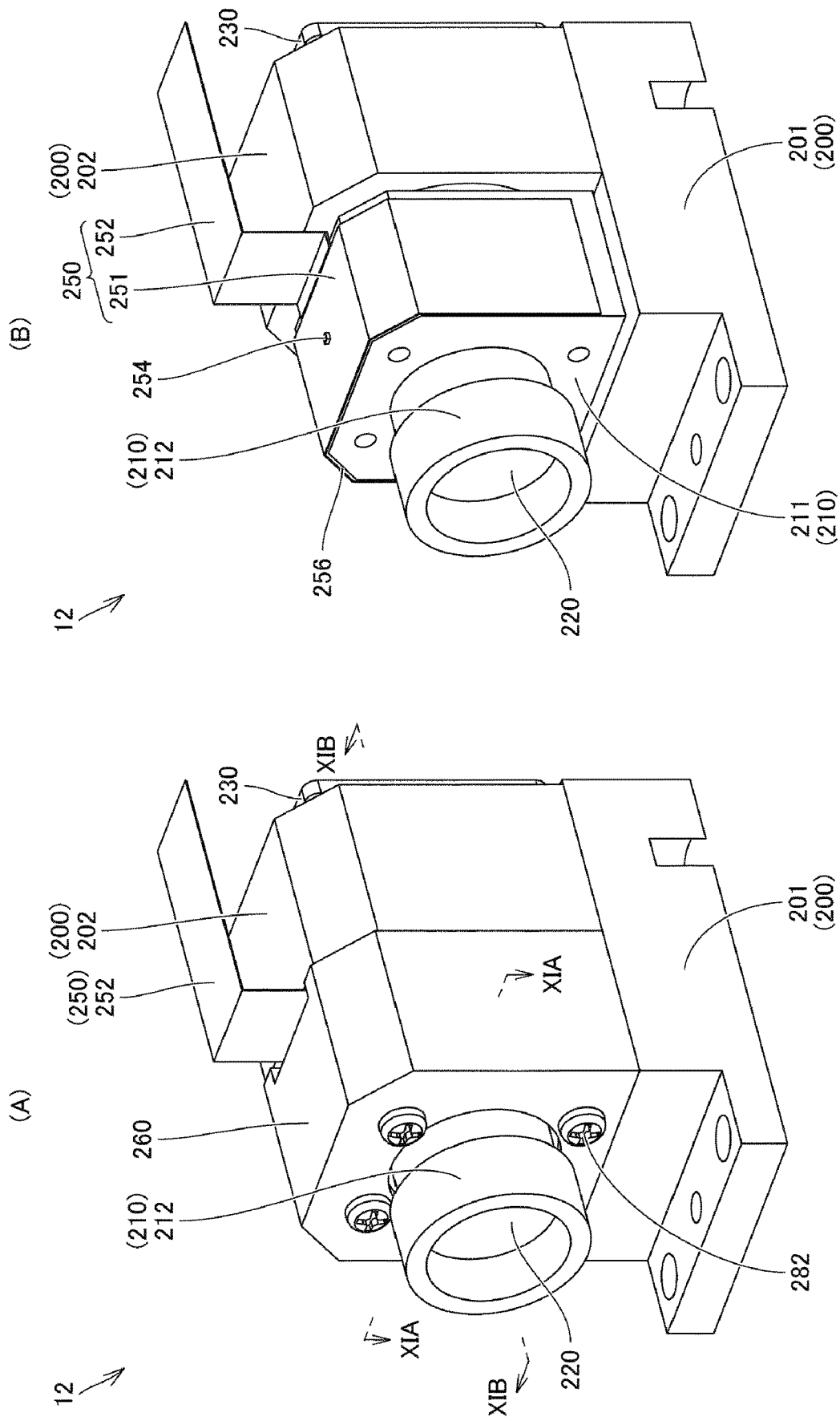
FIG. 10 is a schematic perspective view of the projection part illustrated in FIG. 9.
Figure 11:
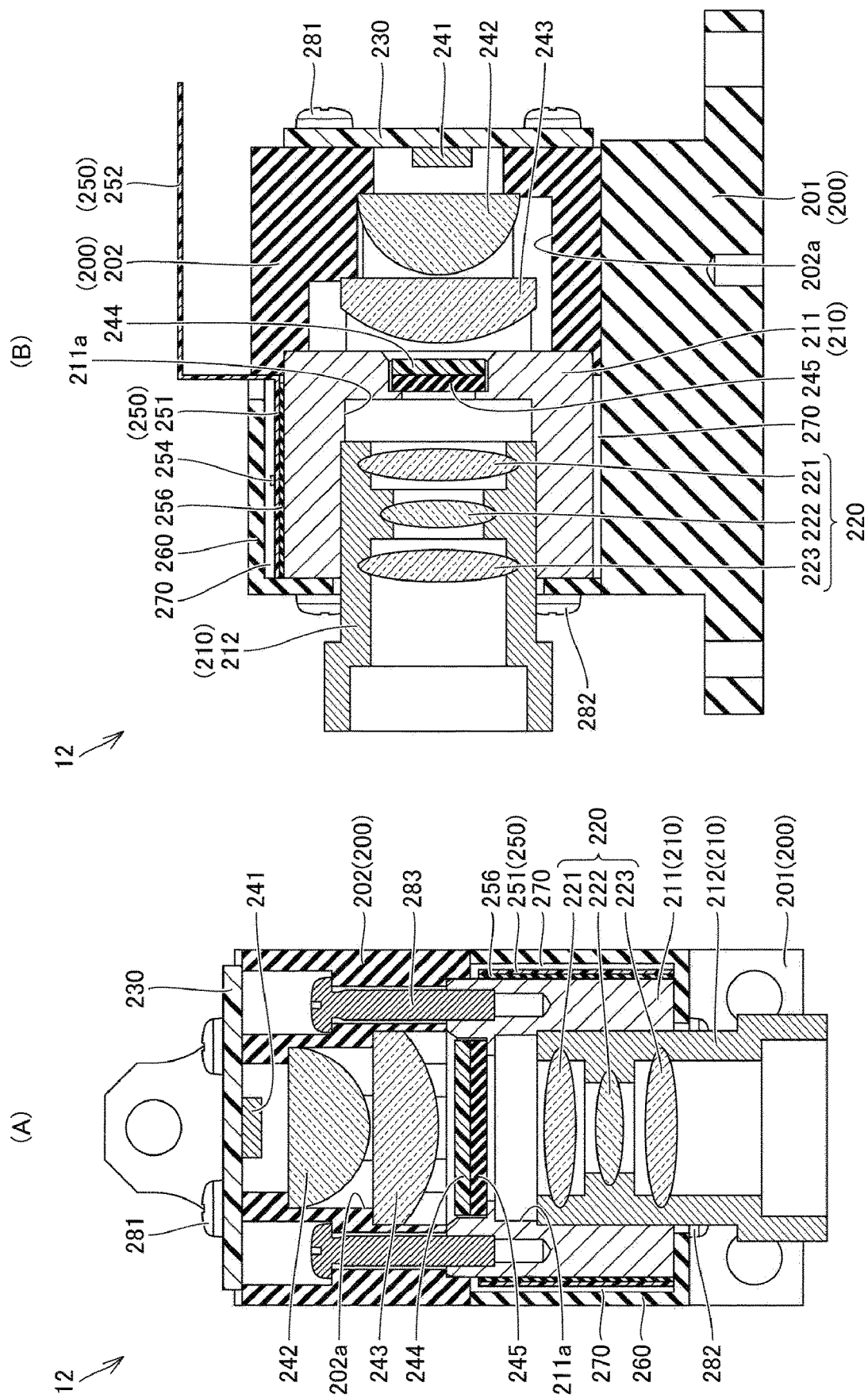
FIG. 11 is a schematic cross-sectional view of the projection part illustrated in FIG. 9.
Figure 12:
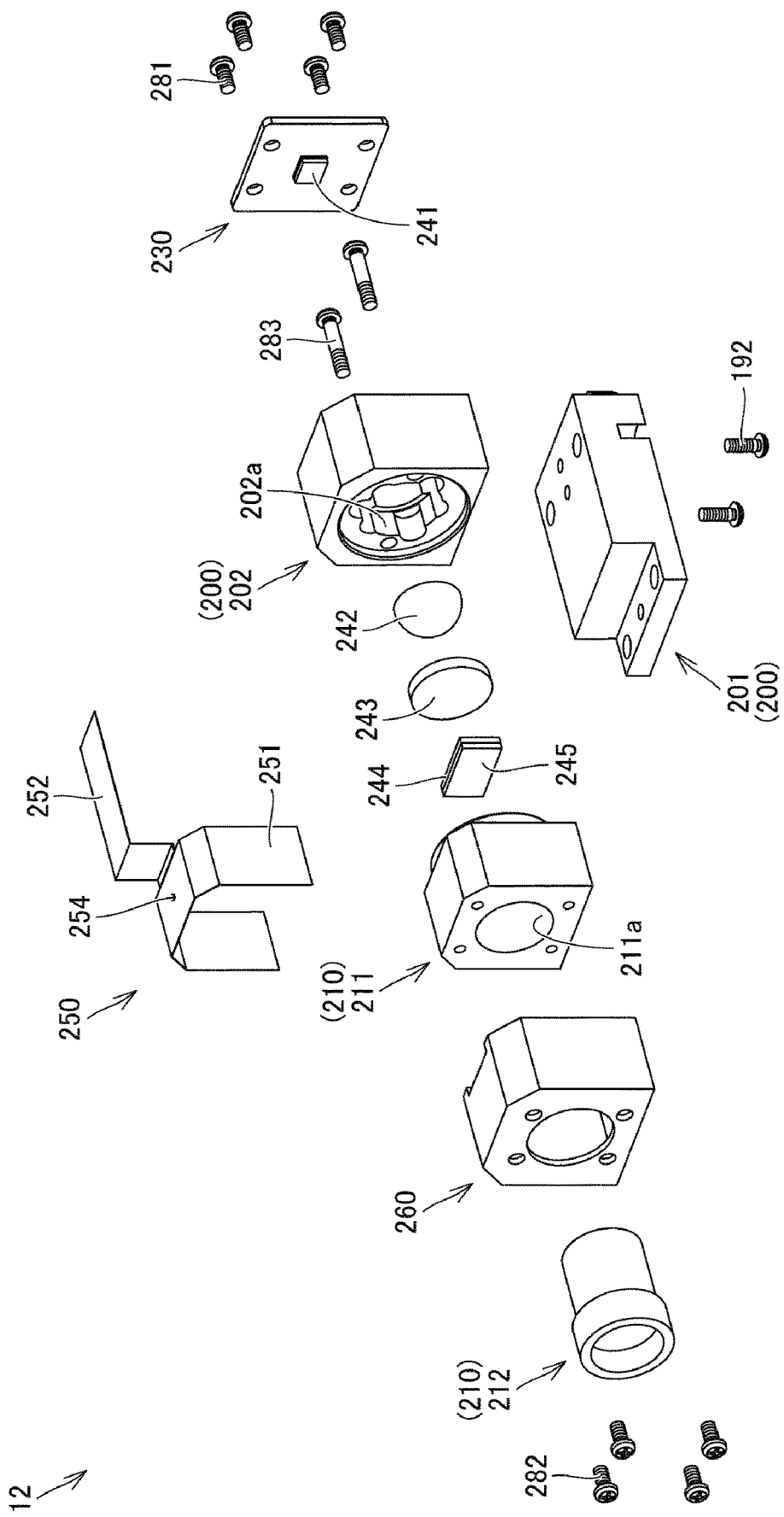
FIG. 12 is an exploded perspective view illustrating an assembly structure of the projection part illustrated in FIG. 9.

FIGS. 10 and 11 are a schematic perspective view and a schematic cross-sectional view of the above-described projection part, respectively, and FIG. 12 is an exploded perspective view illustrating an assembly structure of the projection part. Next, a detailed structure of the projection part 12 according to the present embodiment will be described with reference to FIG. 9 described above and FIGS. 10 to 12.

Here, (A) of FIG. 10 illustrates a state in which a cover member 260, which will be described below, has been assembled to the projection part 12, and (B) of FIG. 10 illustrates a state in which the cover member 260 has been removed from the projection part 12. In addition, (A) and (B) of FIG. 11 represent the cross-sections cut along the lines XIA-XIA and XIB-XIB shown in (A) of FIG. 10.

The projection part 12 mainly includes a base part 200, the lens support part 210, the light projection lens 220, a board 230, the light source 241, the photomask 244, the flexible heater 250, the temperature sensor 254, and the cover member 260 as illustrated in FIGS. 9 to 12.

The base part 200 is a part that serves as a pedestal of the projection part 12 and is installed on the bottom plate 101 of the housing 100. The base part 200 includes a first base 201 fixed to the bottom plate 101 using a screw and a second base 202 fixed to the first base 201 using screws 192 (see FIG. 12). Among these, the second base 202 is fixed while it is placed on the first base 201 and is formed of a member in an externally square cylindrical shape having a hollow part 202a extending in a direction parallel to the optical axis of the light projection lens 220.

The board 230 is assembled to the rear end surface of the second base 202 (i.e., the end surface on the side on which the above-described circuit board 160 is positioned), as illustrated in FIGS. 11 and 12. More specifically, the board 230 is fixed to the rear end surface of the second base 202 using screws 281, and thus the hollow part 202a included in the second base 202 is blocked by the board 230.

The light source 241 is mounted on the surface of the board 230 of a part blocking the hollow part 202a, and thus the light source 241 faces the hollow part 202a. The light source 241 configures a pattern lighting forming element as an optical device in cooperation with lenses 242 and 243 and the photomask 244, and is configured by an LED in the present embodiment.

The second base 202 supports the lenses 242, 243 therein. More specifically, the lenses 242 and 243 are fixed to the second base 202 as the circumferences thereof are supported by the second base 202, and thus are disposed in front of the light source 241 to face the light source 241. The lenses 242 and 243 are so-called collimator lenses that make light emitted from the light source 241 parallel, and configure a pattern lighting forming element as an optical device in cooperation with the light source 241 and the photomask 244.

The lens support part 210 is assembled to the front end of the second base 202 to cover the hollow part 202a. The lens support part 210 has a rear end that is fitted into the hollow part 202a, and includes a mount member 211 that is fixed to the second base 202 using screws 283 and the lens barrel 212 that supports the light projection lens 220 and is fixed to the mount member 211.

The mount member 211 is formed of a metal member having a high thermal conductivity represented by, for example, an aluminum alloy, or the like, and a member in an externally square cylindrical shape with a hollow part 211a extending in a direction parallel to the optical axis of the light projection lens 220. The mount member 211 has the rear end fixed to the second base 202 as described above and supports the photomask 244 and a protective member 245 at a part near the rear end.

The photomask 244 configures the pattern lighting forming element as an optical device in cooperation with the light source 241 and the lenses 242 and 243, and is disposed to face the lenses 242 and 243 serving as collimator lenses supported by the second base 202. The protective member 245 is a member for protecting the photomask and is made of, for example, glass. The photomask 244 and the protective member 245 are fixed to the mount member 211 as their circumferences are supported by the mount member 211 while overlapping each other.

The lens barrel 212 is formed of a cylindrical metal member having a high thermal conductivity represented by, for example, an aluminum alloy, or the like, and the rear end thereof is fitted into the hollow part 211a of the mount member 211 to be fixed. The lens barrel 212 has the front end protruding forward from the mount member 211, and thus the front end is arranged at a position on the front side of the projection part 12.

Here, more specifically, a male thread is provided at the rear end on the outer circumferential surface of the lens barrel 212, and a female thread is provided at the front end on the inner circumferential surface of the hollow part 211a of the mount member 211. For this reason, the lens barrel 212 is screwed into the mount member 211 to be fixed. This type of fixing method is generally called S-Mount.

The light projection lens 220 is configured as a composite lens in which multiple lenses 221 to 223 are combined, and these multiple lenses 221 to 223 are provided to be aligned in the axis direction of the lens barrel 212 inside the lens barrel 212 so that their optical axes overlap each other. Each of these lenses 221 to 223 has a circumference supported by the lens barrel 212. That is, the lens barrel 212 supports the light projection lens 220 by surrounding the lens in a direction orthogonal to the optical axis of the light projection lens 220.

As described above, the light source 241, the lenses 242 and 243 as collimator lenses, the photomask 244, and the multiple lenses 221 to 223 as the light projection lens 220 are disposed to be arranged on the optical axis of the light projection lens 220 inside the projection part 12, and thus a projection pattern from the projection part 12 is radiated to the outside.

Here, the heater part 251 of the flexible heater 250 is assembled onto the outer circumferential surface of the mount member 211 that is a part of the lens support part 210 as illustrated in FIGS. 10 to 12. More specifically, the flexible heater 250 includes a flexible board (e.g., a polyimide board, etc.) on which a heating wire and wiring for energizing the heating wire are provided, and the heater part 251 that is the part in which the heating wire is provided among these is attached to the outer circumferential surface of the mount member 211 using an adhesive tape 256 having a high thermal conductivity.

The wiring part 252 that is a part in which the above-described wiring of the flexible heater 250 is provided is drawn outward from the top surface of the projection part 12, and its tip is connected to the above-described circuit board 160 to be electrically connected to the control part 11a. In addition, the temperature sensor 254 is mounted at a predetermined position on the heater part 251 of the flexible heater 250, and the temperature sensor 254 is also electrically connected to the control part 11a via the wiring provided in the flexible heater 250.

As a result, the light projection lens 220 is heated through the mount member 211 and the lens barrel 212 when the flexible heater 250 is energized. In addition, when the flexible heater 250 is energized over a predetermined period of time, temperatures of the light projection lens 220, the lens barrel 212, the mount member 211, and the heater part 251 of the flexible heater 250 become equal, and thus the temperature sensor 254 can detect the temperature of the light projection lens 220.

Further, although the flexible heater 250 is not assembled to the part on the outer circumferential surface of the mount member 211 facing the first base 201 in the present embodiment, the flexible heater 250 may be further assembled to the part.

The cover member 260 is provided in the projection part 12 to surround the mount member 211 as illustrated in FIGS. 9 to 12. Thus, the above-described heater part 251 of the flexible heater 250 and the temperature sensor 254 mounted in the heater part 251 are covered by the cover member 260.

More specifically, the cover member 260 has a substantial box shape that covers the portion other than the portion of the outer circumferential surface of the mount member 211 facing the first base 201 and the front end surface, and the portion of the cover member on the front end surface side is fixed to the mount member 211 using screws 282 to be assembled to the mount member 211.

Here, the cover member 260 covers substantially the entire region of the outer circumferential surface and the front end surface of the above-described portion of the mount member 211, excluding the portion to draw out the wiring part 252 of the flexible heater 250. As a result, the cover member 260 has a substantially sealed structure in which the mount member 211 is concealed.

An air layer 270 is provided between the cover member 260 and the flexible heater 250 as illustrated in FIG. 11. The air layer 270 is configured by providing a predetermined clearance between the inner surface of the cover member 260 and the exposure surface of the flexible heater 250, and the air layer 270 is substantially sealed by the cover member 260.

Furthermore, the air layer 270 is provided by providing a predetermined clearance between the first base 201 and the mount member 211 as well, and the air layer 270 provided in the portion is also sealed by the cover member 260 in the present embodiment.

As described above, in the projection part 12, the lens barrel 212 and the mount member 211 as the lens support part 210 that surrounds the light projection lens 220 to support it are surrounded by the cover member 260 via the air layer 270, and all of the heater part 251 of the flexible heater 250 and the temperature sensor 254 are covered by the cover member 260.

Here, in the three-dimensional measurement device 1 according to the present embodiment, the control part 11a performs control such that a temperature of the light projection lens 220 is kept at a predetermined constant temperature at the time of three-dimensional measurement as described above. More specifically, the control part 11a causes the temperature of the light projection lens 220 to be kept at the constant temperature by controlling operations of the heater part 251 based on a detection result of the temperature sensor 254 (e.g., energizing, adjusting an output of the heater, etc.).

Thus, because the temperature of the light projection lens 220 can be kept at the constant temperature, it is possible to substantially prevent the focus position of the light projection lens 220 from changing at the time of three-dimensional measurement. For this reason, the photomask 244 can be maintained to be disposed at the focus position of the light projection lens 220 at all times at the time of three-dimensional measurement by configuring such that the photomask 244 as a pattern lighting forming element is disposed at the focus position of the light projection lens 220 in a pre-heated state. Therefore, by employing this configuration, a wide measurement range MR can be secured within a specified temperature range on the projection part 12 side of the three-dimensional measurement device 1.

Furthermore, in the three-dimensional measurement device 1 according to the present embodiment, because the temperature of each of the mount member 211 and the lens barrel 212 as the lens support part 210 that supports the light projection lens 220 can be kept at a constant temperature, it is also possible to substantially prevent the inter-element distance that is the distance between the light projection lens 220 and the photomask 244 in the optical axis direction from fluctuating at the time of three-dimensional measurement. Thus, the photomask 244 can be more reliably maintained to be disposed at the focus position of the light projection lens 220 at all times at the time of three-dimensional measurement.

Further, in the case where the light projection lens 220 is configured as a group lens composed of multiple lenses as in the present embodiment, expansion and contraction of the lens support part 210 composed of the mount member 211 and the lens barrel 212 caused by temperatures significantly affect the fluctuations of the focus position of the light projection lens 220, and thus keeping the temperature of the lens support part 210 constant as described above is particularly effective.

That is, in the three-dimensional measurement device 1 according to the present embodiment, the light projection lens 220 is kept at a predetermined constant temperature at the time of three-dimensional measurement, almost unaffected by the surrounding environment in which the three-dimensional measurement device 1 is installed (in particular, the surrounding environment temperature), and thus a wide measurement range MR can be secured within a specified temperature range on the projection part 12 side as described above.

Here, the first base 201 and the second base 202 as the above-described base part 200 are preferably formed of a member having a lower thermal conductivity than that of the mount member 211 and the lens barrel 212 as the lens support part 210. With this configuration, insulation effects are exhibited by the base part 200.

Thus, by employing the configuration, the light projection lens 220, the mount member 211, and the lens barrel 212 can be heated efficiently, and temperatures thereof can be kept at a constant temperature stably. Thus, the time required for the warm-up operation that is needed in the initial stage at the start of use of the three-dimensional measurement device 1 can be shortened, and the photomask 244 can be more reliably maintained to be disposed at the focus position of the light projection lens 220 at all times at the time of three-dimensional measurement.

In addition, the above-described cover member 260 is preferably formed of a member having a thermal conductivity that is equal to or lower than the thermal conductivity of the mount member 211 and the lens barrel 212 as the lens support part 210. More specifically, in a case where the air layer 270 is provided between the cover member 260 and the mount member 211 as in the present embodiment, a thermal conductivity of the cover member 260 is preferably equal to or lower than a thermal conductivity of the lens support part 210, and in a case where the cover member 260 is brought into close contact with the mount member 211 or the like, unlike in the present embodiment, a thermal conductivity of the cover member 260 is preferably lower than a thermal conductivity of the lens support part 210. With this configuration, insulation effects are exhibited by the air layer 270 in addition to the cover member 260.

Thus, by employing the configuration, the light projection lens 220, the mount member 211, and the lens barrel 212 can be heated efficiently, and temperatures thereof can be kept at a constant temperature stably. Thus, the time required for the warm-up operation that is needed in the initial stage at the start of use of the three-dimensional measurement device 1 can be shortened, and the photomask 244 can be more reliably maintained to be disposed at the focus position of the light projection lens 220 at all times at the time of three-dimensional measurement.

Further, from the above-described perspective, the first base 201 and the second base 202 as the base part 200 and the cover member 260 are preferably formed of a resin member represented by a polyphenylene sulfide (PPS) resin, a polycarbonate (PC) resin, or the like, or a metal member having a relatively low thermal conductivity. However, in such a case where the air layer 270 is provided between the cover member 260 and the mount member 211 as in the present embodiment, a metal member having a relatively high thermal conductivity (e.g., an aluminum alloy member) may be used as the cover member 260.

Meanwhile, a temperature of the light projection lens 220 to be kept constantly by the above-described control part 11a is preferably a temperature that is equal to or higher than a highest temperature that the light projection lens 220 can reach when the flexible heater 250 does not heat the light projection lens 220 within the range of the surrounding environment temperature in which use of the projection part 12 is allowed and lower than or equal to the upper limit of an operation-guaranteed temperature of the pattern lighting forming element. With this configuration, a projection part with a long life and high reliability while securing a wide measurement range MR within a specified temperature range and a three-dimensional measurement device with the projection part can be provided.

Here, the above-mentioned upper limit of the operation-guaranteed temperature of the pattern lighting forming element is the lowest temperature among upper limits of operation-guaranteed temperatures of multiple constituent components if the pattern lighting forming element is composed of the multiple constituent components. Thus, because the pattern lighting forming element is composed of the light source 241, the lenses 242 and 243, and the photomask 244 in the present embodiment as described above, the lowest temperature among upper limits of the operation-guaranteed temperatures of the light source 241, the lenses 242 and 243, and the photomask 244 is the upper limit of the operation-guaranteed temperature of the pattern lighting forming element. Further, as a matter of course, a temperature of the light projection lens 220 to be kept constant by the control part 11a needs to be equal to or lower than the upper limit of the operation-guaranteed temperature of the light projection lens 220.

In addition, in the three-dimensional measurement device 1 according to the present embodiment, the flexible heater 250 is configured to heat the light projection lens 220, the mount member 211, and the lens barrel 212 and the temperature sensor 254 is mounted in the flexible heater 250 as described above. With the above-described configuration, the light projection lens 220, the mount member 211, and the lens barrel 212 can be heated with a simple configuration, temperatures of the light projection lens 220 can be measured with a simple configuration, thus assembly work becomes easier, and as a result, production costs can be reduced.

Furthermore, in the three-dimensional measurement device 1 according to the present embodiment, the flexible heater 250 is configured to be attached to the mount member 211 using the adhesive tape 256 having a high thermal conductivity. With this configuration, the flexible heater 250 can be easily assembled to the mount member 211 while increasing thermal transfer efficiency, and the temperature sensor 254 can be easily assembled to the mount member 211 while more accurate temperatures can be measured. Therefore, production costs can also be reduced due to this point.

H. Structure of Imaging part

Figure 13:
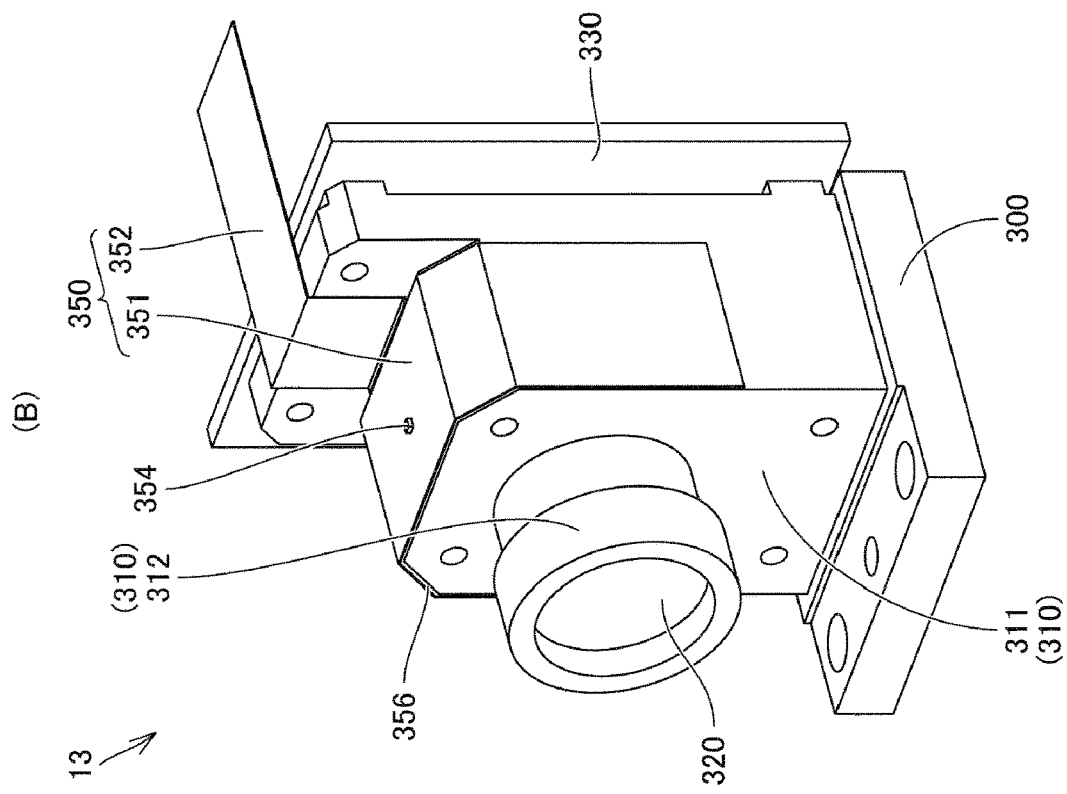
FIG. 13 is a schematic perspective view of the imaging part illustrated in FIG. 9.
Figure 13:
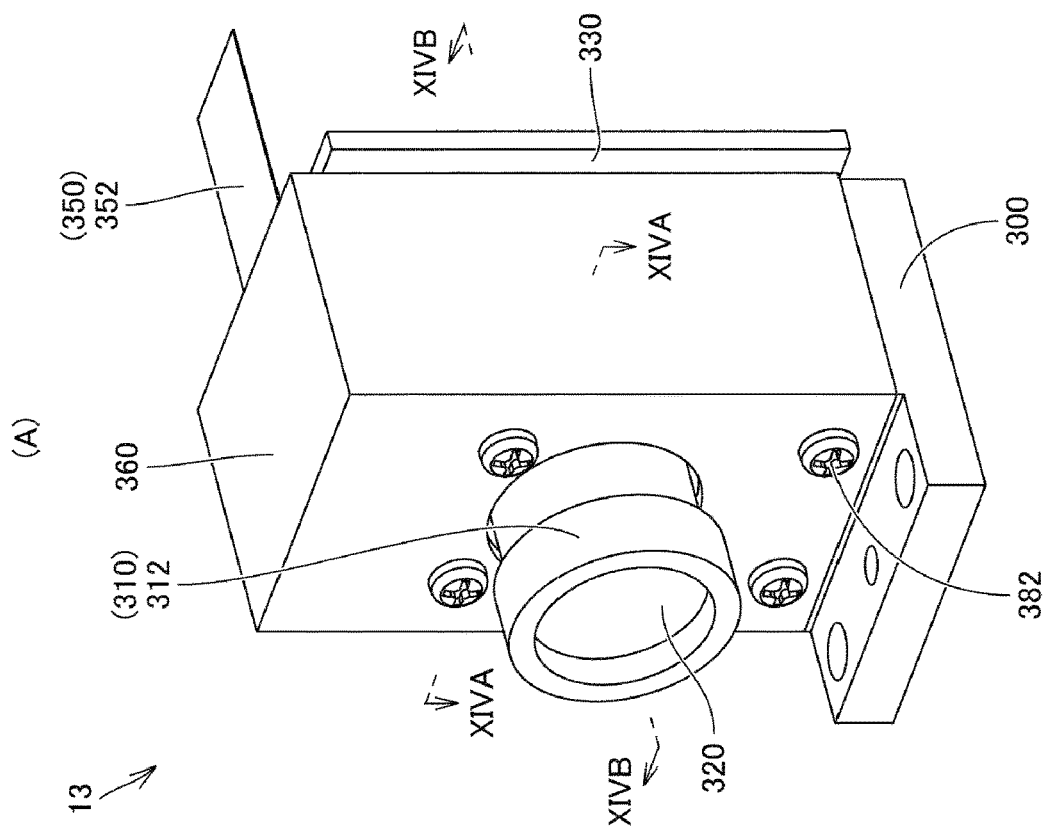
Figure 15:
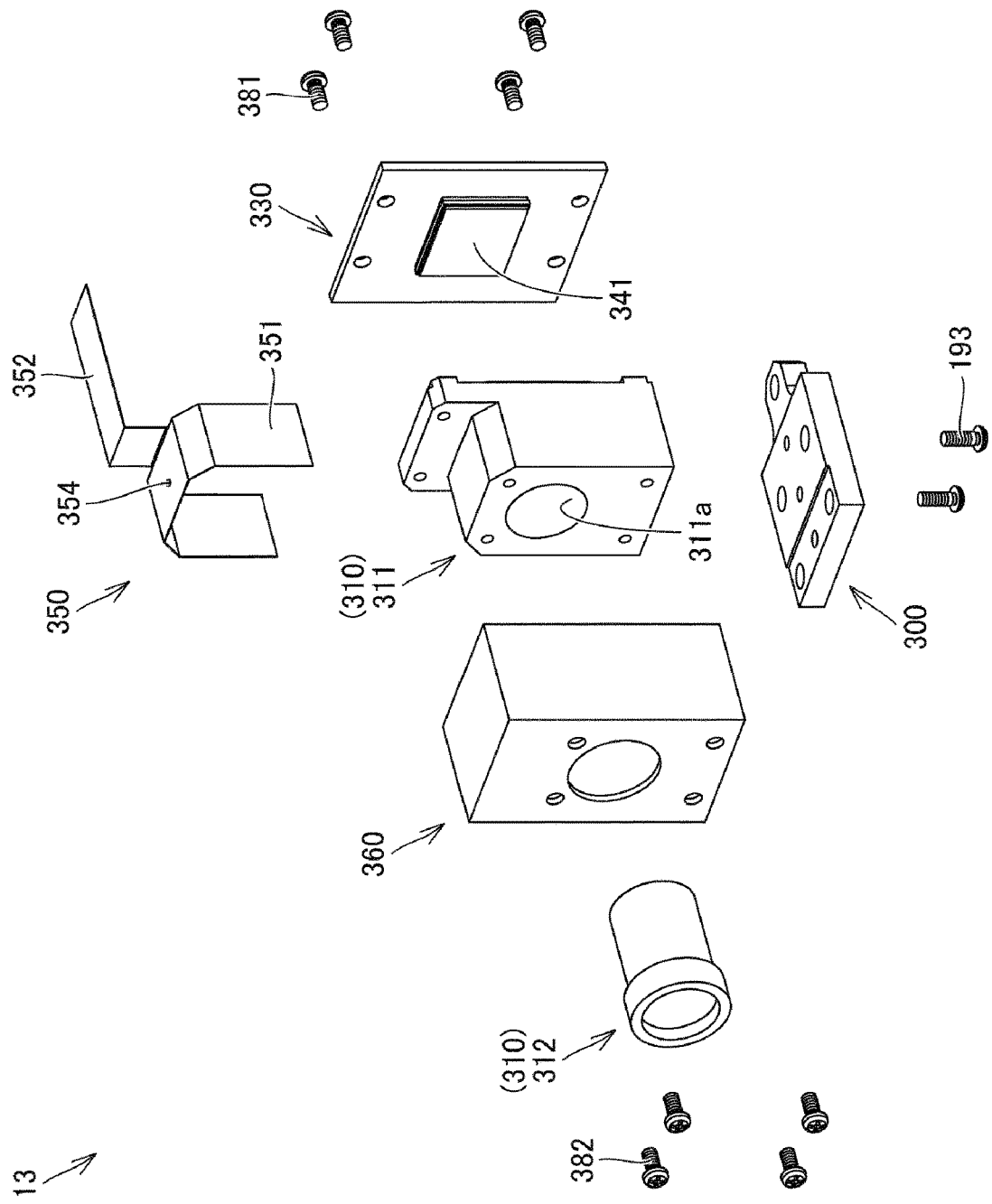
FIG. 15 is an exploded perspective view illustrating an assembly structure of the imaging part illustrated in FIG. 9.

FIGS. 13 and 14 are a schematic perspective view and a schematic cross-sectional view of the above-described imaging part, respectively, and FIG. 15 is an exploded perspective view illustrating an assembly structure of the imaging part. Next, a detailed structure of the imaging part 13 according to the present embodiment will be described with reference to FIG. 9 described above and FIGS. 13 to 15.

Here, (A) of FIG. 13 illustrates a state in which a cover member 360, which will be described below, has been assembled to the imaging part 13, and (B) of FIG. 13 illustrates a state in which the cover member 360 has been removed from the imaging part 13. In addition, (A) and (B) of FIG. 14 represent the cross-sections cut along the lines XIVA-XIVA and XIVB-XIVB shown in (A) of FIG. 13.

The imaging part 13 mainly includes a base part 300, the lens support part 310, the light receiving lens 320, a board 330, the image sensor 341, the flexible heater 350, the temperature sensor 354, and the cover member 360 as illustrated in FIGS. 9 and 13 to 15.

The base part 300 is a part that serves as a pedestal of the imaging part 13 and is installed on the bottom plate 101 of the housing 100. The base part 300 is fixed to the bottom plate 101 with screws.

The lens support part 310 is fixed into the base part 300 in a state in which the lens support part is placed thereon. The lens support part 310 includes a mount member 311 that is fixed to the base part 300 using screws 193 (see FIG. 15) and the lens barrel 312 that supports the light receiving lens 320 and is fixed to the mount member 311.

The mount member 311 is formed of a metal member having a high thermal conductivity represented by, for example, an aluminum alloy, or the like, and a member in an externally square cylindrical shape with a hollow part 311a extending in a direction parallel to the optical axis of the light receiving lens 320.

The board 330 is assembled to the rear end surface of the mount member 311 (i.e., the end surface on the side on which the above-described circuit board 160 is positioned) as illustrated in FIGS. 14 and 15. More specifically, the board 330 is fixed to the rear end surface of the mount member 311 using screws 381, and thus the hollow part 311a included in the mount member 311 is blocked by the board 330.

The image sensor 341 is mounted on the surface of the board 330 at the part blocking the hollow part 311a, and thus the image sensor 341 faces the hollow part 311a. The image sensor 341 is composed of, for example, complementary oxide semiconductor (CMOS) image sensor, a charge-coupled device (CCD) image sensor, or the like. A frame-shaped light shielding member 342 is provided on the surface of the board 330 around the image sensor 341.

The lens barrel 312 is formed of a cylindrical metal member having a high thermal conductivity represented by, for example, an aluminum alloy, or the like, and the rear end thereof is fitted into the hollow part 311a of the mount member 311 to be fixed. The lens barrel 312 has the front end protruding forward from the mount member 311, and thus the front end is arranged at a position on the front side of the imaging part 13.

Here, more specifically, a male thread is provided at the rear end on the outer circumferential surface of the lens barrel 312, and a female thread is provided at the front end on the inner circumferential surface of the hollow part 311a of the mount member 311. For this reason, the lens barrel 312 is screwed into the mount member 311 to be fixed. This type of fixing method is generally called S-Mount.

The light receiving lens 320 is configured as a composite lens in which multiple lenses 321 to 323 are combined, and these multiple lenses 321 to 323 are provided to be aligned in the axis direction of the lens barrel 312 inside the lens barrel 312 so that their optical axes overlap each other. Each of these lenses 321 to 323 has a circumference supported by the lens barrel 312. That is, the lens barrel 312 supports the light receiving lens 320 by surrounding the light receiving lens in a direction orthogonal to the optical axis of the light receiving lens 320.

As described above, the image sensor 341 and the multiple lenses 321 to 323 as the light receiving lens 320 are disposed to be arranged on the optical axis of the light receiving lens 320 inside the imaging part 13, and the image sensor 341 receives light incident on the imaging part 13 to obtain an input image.

Here, the heater part 351 of the flexible heater 350 is assembled onto the outer circumferential surface of the mount member 311 that is a part of the lens support part 310 as illustrated in FIGS. 13 to 15. More specifically, the flexible heater 350 includes a flexible board (e.g., a polyimide board, etc.) on which a heating wire and wiring for energizing the heating wire are provided, and the heater part 351 that is the part in which the heating wire is provided among these is attached to the outer circumferential surface of the mount member 311 using an adhesive tape 356 having a high thermal conductivity.

Meanwhile, a wiring part 352 that is a part in which the above-described wiring of the flexible heater 350 is provided is drawn outward from the top surface of the imaging part 13, and its tip is connected to the above-described circuit board 160 to be electrically connected to the control part 11a. In addition, the temperature sensor 354 is mounted at a predetermined position on the heater part 351 of the flexible heater 350, and the temperature sensor 354 is also electrically connected to the control part 11a via the wiring provided in the flexible heater 350.

As a result, the light receiving lens 320 is heated through the mount member 311 and the lens barrel 312 when the flexible heater 350 is energized. In addition, when the flexible heater 350 is energized over a predetermined period of time, temperatures of the light receiving lens 320, the lens barrel 312, the mount member 311, and the heater part 351 of the flexible heater 350 become equal, and thus the temperature sensor 354 can detect the temperature of the light receiving lens 320.

Further, because the portion of the outer circumferential surface of the mount member 311 facing the base part 300 is brought in close contact with the base part 300 in the present embodiment, the flexible heater 350 may not be assembled at the portion of the outer circumferential surface of the mount member 311.

The cover member 360 is provided in the imaging part 13 to surround the mount member 311 as illustrated in FIGS. 9 and 13 to 15. Thus, the above-described heater part 351 of the flexible heater 350 and the temperature sensor 354 mounted on the heater part 351 are covered by the cover member 360.

More specifically, the cover member 360 has a substantial box shape that covers the portion other than the portion of the outer circumferential surface of the mount member 311 facing the base part 300 and the front end surface, and the portion of the cover member on the front end surface side is fixed to the mount member 311 using screws 382 to be assembled to the mount member 311.

Here, the cover member 360 covers substantially the entire region of the outer circumferential surface and the front end surface of the above-described portion of the mount member 311, excluding the portion to draw out the wiring part 352 of the flexible heater 350. As a result, the cover member 360 has a substantially sealed structure in which the mount member 311 is concealed.

An air layer 370 is provided between the cover member 360 and the flexible heater 350 as illustrated in FIG. 14. The air layer 370 is configured by providing a predetermined clearance between the inner surface of the cover member 360 and the exposure surface of the flexible heater 350, and the air layer 370 is substantially sealed by the cover member 360.

As described above, in the imaging part 13, the lens barrel 312 and the mount member 311 as the lens support part 310 that surrounds the light receiving lens 320 are surrounded by the cover member 360 via the air layer 370, and all of the heater part 351 of the flexible heater 350 and the temperature sensor 354 are covered by the cover member 360.

Here, in the three-dimensional measurement device 1 according to the present embodiment, the control part 11a performs control such that a temperature of the light receiving lens 320 is kept at a predetermined constant temperature at the time of three-dimensional measurement as described above. More specifically, the control part 11a causes the temperature of the light receiving lens 320 to be kept at the constant temperature by controlling operations of the heater part 351 based on a detection result of the temperature sensor 354 (e.g., energizing, adjusting an output of the heater, etc.).

Thus, because the temperature of the light receiving lens 320 can be kept at the constant temperature, it is possible to substantially prevent the focus position of the light receiving lens 320 from changing at the time of three-dimensional measurement. For this reason, the image sensor 341 can be maintained to be disposed at the focus position of the light receiving lens 320 at all times at the time of three-dimensional measurement by configuring such that the image sensor 341 is disposed at the focus position of the light receiving lens 320 in a pre-heated state. Therefore, by employing this configuration, a wide measurement range MR can be secured within a specified temperature range on the imaging part 13 side of the three-dimensional measurement device 1.

Furthermore, in the three-dimensional measurement device 1 according to the present embodiment, because the temperature of each of the mount member 311 and the lens barrel 312 as the lens support part 310 that supports the light receiving lens 320 can be kept at a constant temperature, it is also possible to substantially prevent the inter-element distance that is the distance between the light receiving lens 320 and the image sensor 341 in the optical axis direction from fluctuating at the time of three-dimensional measurement. Thus, the image sensor 341 can be more reliably maintained to be disposed at the focus position of the light receiving lens 320 at all times at the time of three-dimensional measurement.

Further, in the case where the light receiving lens 320 is configured as a group lens composed of multiple lenses as in the present embodiment, expansion and contraction of the lens support part 310 composed of the mount member 311 and the lens barrel 312 caused by temperatures significantly affect the fluctuations of the focus position of the light receiving lens 320, and thus keeping the temperature of the lens support part 310 constant as described above is particularly effective.

That is, in the three-dimensional measurement device 1 according to the present embodiment, the light receiving lens 320 is kept at a predetermined constant temperature at the time of three-dimensional measurement, almost unaffected by the surrounding environment in which the three-dimensional measurement device 1 is installed (in particular, the surrounding environment temperature), and thus a wide measurement range MR can be secured within a specified temperature range on the imaging part 13 side as described above.

Here, the above-described cover member 300 is preferably formed of a member having a thermal conductivity that is lower than the thermal conductivity of the mount member 311 and the lens barrel 312 as the lens support part 310. With this configuration, insulation effects are exhibited by the base part 300.

Thus, by employing the configuration, the light receiving lens 320, the mount member 311, and the lens barrel 312 can be heated efficiently, and temperatures thereof can be kept at a constant temperature stably. Thus, the time required for the warm-up operation that is needed in the initial stage at the start of use of the three-dimensional measurement device 1 can be shortened, and the image sensor 341 can be more reliably maintained to be disposed at the focus position of the light receiving lens 320 at all times at the time of three-dimensional measurement.

In addition, the above-described cover member 360 is preferably formed of a member having a thermal conductivity that is equal to or lower than the thermal conductivity of the mount member 311 and the lens barrel 312 as the lens support part 310. More specifically, in a case where the air layer 370 is provided between the cover member 360 and the mount member 311 as in the present embodiment, a thermal conductivity of the cover member 360 is preferably equal to or lower than a thermal conductivity of the lens support part 310, and in a case where the cover member 360 is brought into close contact with the mount member 311 or the like, unlike in the present embodiment, the thermal conductivity of the cover member 360 is preferably lower than the thermal conductivity of the lens support part 310. With this configuration, insulation effects are exhibited by the air layer 370 in addition to the cover member 360.

Thus, by employing the configuration, the light receiving lens 320, the mount member 311, and the lens barrel 312 can be heated efficiently, and temperatures thereof can be kept at a constant temperature stably. Thus, the time required for the warm-up operation that is needed in the initial stage at the start of use of the three-dimensional measurement device 1 can be shortened, and the image sensor 341 can be more reliably maintained to be disposed at the focus position of the light receiving lens 320 at all times at the time of three-dimensional measurement.

Further, from the above-described perspective, the base part 300 and the cover member 360 are preferably formed of a resin member represented by a polyphenylene sulfide (PPS) resin, a polycarbonate (PC) resin, or the like, or a metal member having a relatively low thermal conductivity. However, in such a case where the air layer 370 is provided between the cover member 360 and the mount member 311 as in the present embodiment, a metal member having a relatively high thermal conductivity (e.g., an aluminum alloy member) may be used as the cover member 360.

Meanwhile, a temperature of the light receiving lens 320 to be kept constantly by the above-described control part 11a is preferably a temperature that is equal to or higher than a highest temperature that the light receiving lens 320 can reach when the flexible heater 350 does not heat the light receiving lens 320 within the range of the surrounding environment temperature in which use of the imaging part 13 is allowed and lower than or equal to the upper limit of an operation-guaranteed temperature of the image sensor 341. With this configuration, an imaging part with a long life and high reliability while securing a wide measurement range MR within a specified temperature range and a three-dimensional measurement device with the imaging part can be provided.

Here, the above-mentioned upper limit of the operation-guaranteed temperature of the image sensor 341 is an upper limit of an operation-guaranteed temperature of a single constituent component if the image sensor 341 is composed of the single constituent component such as a CMOS image sensor or a CCD image sensor as in the present embodiment, and if the image sensor is composed of multiple constituent components, the upper limit is the lowest temperature among upper limits of operation-guaranteed temperatures of the multiple constituent components. Further, as a matter of course, a temperature of the light receiving lens 320 to be kept constant by the control part 11a needs to be equal to or lower than the upper limit of the operation-guaranteed temperature of the light receiving lens 320.

In addition, in the three-dimensional measurement device 1 according to the present embodiment, the flexible heater 350 is configured to heat the light receiving lens 320, the mount member 311, and the lens barrel 312, and the temperature sensor 354 is mounted in the flexible heater 350 as described above. With the above-described configuration, the light receiving lens 320, the mount member 311, and the lens barrel 312 can be heated with a simple configuration, temperatures of the light receiving lens 320 can be measured with a simple configuration, thus assembly work becomes easier, and as a result, production costs can be reduced.

Furthermore, in the three-dimensional measurement device 1 according to the present embodiment, the flexible heater 350 is configured to be attached to the mount member 311 using the adhesive tape 356 having a high thermal conductivity. With this configuration, the flexible heater 350 can be easily assembled to the mount member 311 while increasing thermal transfer efficiency, and the temperature sensor 354 can be easily assembled to the mount member 311 while more accurate temperatures can be measured. Therefore, production costs can also be reduced due to this point.

I. Heat Dissipation Structure of Projection Part and Imaging Part

Figure 16:
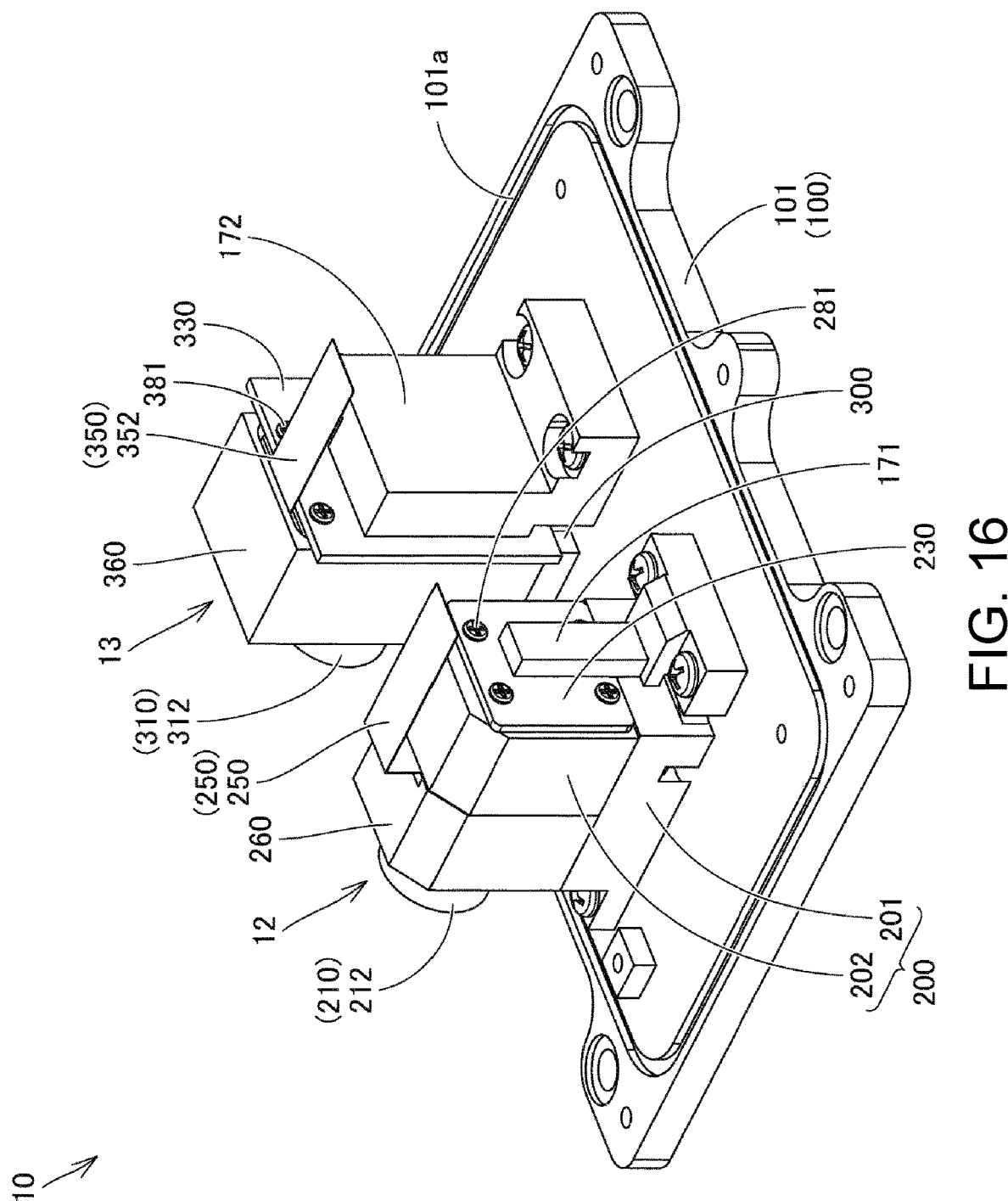
FIG. 16 is a schematic perspective view illustrating a heat dissipation structure of the projection part and the imaging part illustrated in FIG. 9.

FIG. 16 is a schematic perspective view illustrating a heat dissipation structure of the projection part and the imaging part according to the present embodiment. The heat dissipation structure of the projection part 12 and the imaging part 13 according to the present embodiment will be described with reference to FIG. 9 described above and FIG. 16. Further, some of internal constituent components are not illustrated in FIG. 16.

The light source 241 included in the projection part 12 and the image sensor 341 included in the imaging part 13 described above are all heat generating components, and the light source 241 and the image sensor 341 need to be used within the operation-guaranteed temperature ranges. If no heat dissipation structure has been employed in such a case, there is concern that the light source 241 and the image sensor 341 exceed the upper limits of the operation-guaranteed temperatures.

Particularly, because all of the light projection lens 220 included in the projection part 12 and the light receiving lens 320 included in the imaging part 13 described above are configured to be heated at the time of three-dimensional measurement in the three-dimensional measurement device 1 according to the present embodiment, the heat particularly generated from the light source 241 and the image sensor 341 needs to be dissipated efficiently.

For this reason, if the three-dimensional measurement device 1 according to the present embodiment employs the following heat dissipation structure, the heat generated from the light source 241 and the image sensor 341 can be dissipated efficiently.

If the three-dimensional measurement device 1 according to the present embodiment, a heat dissipation block 171 is provided between the rear side of the projection part 12 and the front side of the circuit board 160 (which is not illustrated in FIG. 16) as illustrated in FIGS. 9 and 16. The heat dissipation block 171 has a pedestal part fixed to the bottom plate 101 of the housing 100 and the portion erected from the pedestal part is in pressure contact with the rear surface of the board 230 positioned at the rear end of the projection part 12.

Here, the rear surface of the board 230 in pressure contact with the portion of the heat dissipation block 171 corresponds to the portion on which the above-described light source 241 is mounted, and preferably, a heat dissipation sheet having a high thermal conductivity is interposed between the heat dissipation block 171 and the board 230. Further, the heat dissipation block 171 is preferably formed of a metal member having a high thermal conductivity, and for example, an aluminum alloy or brass can be used.

With this configuration, heat generated by the light source 241 is transferred to the bottom plate 101 of the housing 100 via the board 230 and the heat dissipation block 171. For this reason, the heat generated by the light source 241 can be dissipated efficiently, and thus the light source can be used within the operation-guaranteed temperature range.

Meanwhile, in the three-dimensional measurement device 1 according to the present embodiment, a heat dissipation block 172 is provided between the rear side of the imaging part 13 and the front side of the circuit board 160 (which is not illustrated in FIG. 16). The heat dissipation block 172 has a pedestal part fixed to the bottom plate 101 of the housing 100 and the portion erected from the pedestal part is in pressure contact with the rear surface of the board 330 positioned at the rear end of the imaging part 13.

Here, the rear surface of the board 330 in pressure contact with the portion of the heat dissipation block 172 corresponds to the portion on which the above-described image sensor 341 is mounted, and preferably, a heat dissipation sheet having a high thermal conductivity is interposed between the heat dissipation block 172 and the board 330. Further, the heat dissipation block 172 is preferably formed of a metal member having a high thermal conductivity, and for example, an aluminum alloy or brass can be used.

With this configuration, heat generated by the image sensor 341 is transferred to the bottom plate 101 of the housing 100 via the board 330 and the heat dissipation block 172. For this reason, the heat generated by the image sensor 341 can be dissipated efficiently, and thus the image sensor can be used within the operation-guaranteed temperature range.

J. Sealed Structure of Housing

Figure 17:
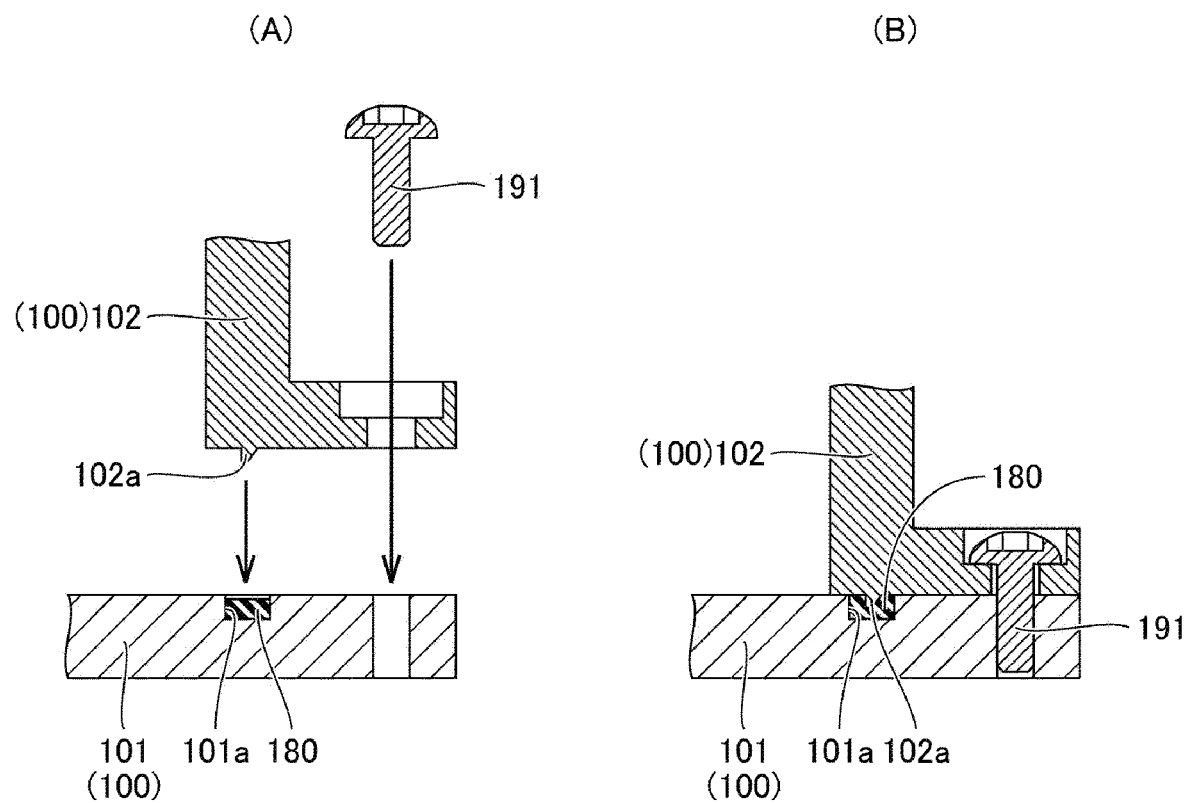
FIG. 17 is a schematic cross-sectional view illustrating a sealed structure of the housing of the measurement head illustrated in FIG. 1.

FIG. 17 is a schematic cross-sectional view illustrating a sealed structure of the housing of the measurement head according to the present embodiment. The sealed structure of the housing 100 of the measurement head 10 according to the present embodiment will be described with reference to FIGS. 8 and 16 described above and FIG. 17. Further, (A) of FIG. 17 represents a state before the housing 100 is assembled, and (B) of FIG. 17 represents a state after the housing 100 is assembled.

In the measurement head 10 described above, the projection part 12 employs a substantially sealed structure in which the light projection lens 220 to be heated, the lens support part 210 supporting the lens, and the like are substantially sealed by the cover member 260, and the imaging part 13 employs a substantially sealed structure in which the light receiving lens 320 to be heated, the lens support part 310 supporting the lens, and the like are substantially sealed by the cover member 360.

However, because these cover members 260 and 360 do not seal heating targets in the complete sense, if the internal space of the housing 100 communicates with the external space, there is concern that temperature of a heating target is kept at a constant temperature unstably. Furthermore, if such cover members 260 and 360 are not provided in the projection part 12 and the imaging part 13, it is more difficult to keep temperature of a heating target at a constant temperature.

For this reason, if the three-dimensional measurement device 1 according to the present embodiment employs the following sealed structure of the housing 100, a heating target can be kept at a constant temperature stably.

A groove 101a is provided in the bottom plate 101 of the housing 100 to extend along a circumference of the bottom plate 101 as illustrated in FIGS. 9, 16, and 17. The groove 101a is provided to face a periphery of the lower end of the cover 102 of the housing 100. A plug 180 is contained inside the groove 101a as illustrated in FIG. 17.

Meanwhile, a protrusion 102a is provided at a portion of the lower end of the cover 102 of the housing 100 facing the above-described groove 101a as illustrated in FIG. 17. The protrusion 102a is provided to extend along the periphery of the lower end of the cover 102, and a width thereof is smaller than a width of the groove 101a.

When the housing 100 is assembled, the cover 102 is overlapped on the bottom plate 101 as illustrated in FIG. 17. Thus, the plug 180 contained inside the bottom plate 101 is compressed by the protrusion 102a provided in the cover 102, and thus the plug 180 brings the bottom plate 101 in close contact with the cover 102. For this reason, the gap that can be made at the boundary between the bottom plate 101 and the cover 102 is sealed by the plug 180, and thus the internal space of the housing 100 is sealed from the external space.

Further, although detailed description will be omitted here, due to a plug interposed between the light transmitting plates 111, 121, and 131, and the connection terminals 141 and 142 and the periphery of the opening provided in the cover 102 for the portion of the cover 102 of the housing 100 in which the lighting window 110, the light projection window 120, the light receiving window 130, and the connection terminals 141 and 142 are provided, the internal space of the housing 100 is sealed from the external space in the portions.

With this configuration, the light projection lens 220 to be heated, the lens support part 210 that supports the lens, the light receiving lens 320, and the lens support part 310 that supports the lens, and the like can be kept at a constant temperature stably.

K. Others

The present inventor has actually made a prototype of the three-dimensional measurement device 1 according to the above-described embodiment to ascertain how much difference in heating efficiency would be made between a case where the cover members 260 and 360 are attached to the projection part 12 and the imaging part 13 and a case where the cover members 260 and 360 are removed from the projection part 12 and the imaging part 13. Further, a constant temperature to be kept in the light projection lens 220 and the light receiving lens 320 is set to about 60° C. to 70° C.

As a result, it has been confirmed that, in the case where the cover members 260 and 360 were removed from the projection part 12 and the imaging part 13, the time required for a warm-up operation that is needed in the initial stage at the start of use of the three-dimensional measurement device 1 (i.e., the time taken for both the light projection lens 220 and the light receiving lens 320 to reach a predetermined constant temperature) was about 10 minutes, but the time required for the warm-up operation was shortened to about two minutes in the case where the cover members 260 and 360 were attached to the projection part 12 and the imaging part 13.

Furthermore, it has been confirmed that, in the case where the cover members 260 and 360 were removed from the projection part 12 and the imaging part 13, the time taken for the temperature to decrease by 1° C. after the flexible heaters 250 and 350 stopped heating was about one second, but the time was delayed to about 10 seconds in the case where the cover members 260 and 360 were attached to the projection part 12 and the imaging part 13.

That is, the result of the former test indicates that the light projection lens 220 and the light receiving lens 320 was heated very efficiently as the cover members 260 and 360 were attached to the projection part 12 and the imaging part 13, and the result of the latter test indicates that insulation performance was improved and the electric power to be consumed for heating at the time of three-dimensional measurement was dramatically saved as the cover members 260 and 360 were attached to the projection part 12 and the imaging part 13.

It has been confirmed from the tests that a three-dimensional measurement device with satisfactory heating efficiency can be obtained by configuring the three-dimensional measurement device 1 according to the present embodiment as described above.

L. Supplement

Characteristic configurations of the optical assembly for a three-dimensional measurement device and the three-dimensional measurement device equipped with the assembly according to the present embodiment described above can be summarized as follows.
[Configuration 1]
An optical assembly for a three-dimensional measurement device includes
an optical lens (220 or 320) that forms a pair of conjugate planes having an optically conjugate relationship;
an optical device (244 or 341) that is disposed on one of the pair of conjugate planes;
a temperature sensor (254 or 354) for detecting a temperature of the optical lens;
a heater (251 or 351) for heating the optical lens; and
a control part (11*a*) that controls an operation of the heater based on a detection result of the temperature sensor such that the optical lens has a constant temperature.
[Configuration 2]
The optical assembly for a three-dimensional measurement device described in configuration 1, further including:
a lens support part (210 or 310) that surrounds the optical lens in a direction orthogonal to an optical axis of the optical lens to support the lens,
in which the temperature sensor and the heater are assembled to the lens support part.
[Configuration 3]
The optical assembly for a three-dimensional measurement device described in configuration 2, further comprising:
a cover member (260 or 360) that surrounds the lens support part and covers the temperature sensor and the heater,
in which a thermal conductivity of the cover member is equal to or lower than a thermal conductivity of the lens support part.
[Configuration 4]
The optical assembly for a three-dimensional measurement device described in configuration 3,
in which the lens support part has a lens barrel (212 or 312) that supports the optical lens and a mount member (211 or 311) to which the lens barrel is fixed, and the cover member has a substantially sealed structure in which the mount member is concealed.
[Configuration 5]
The optical assembly for a three-dimensional measurement device described in configuration 4,
in which an air layer (270 or 370) is provided in at least a portion between the cover member and the mount member.
[Configuration 6]
The optical assembly for a three-dimensional measurement device described in any of configurations 2 to 5, further including:
a base part (200 or 300) to which the lens support part is fixed,
in which a thermal conductivity of the base part is equal to or lower than the thermal conductivity of the lens support part.
[Configuration 7]
The optical assembly for a three-dimensional measurement device described in any of configurations 2 to 6,
in which the heater is configured as a flexible heater (250 or 350) composed of a flexible board on which a heating wire is provided,
the temperature sensor is mounted on the flexible board, and
the flexible heater is disposed on an outer circumferential surface of the lens support part.
[Configuration 8]
The optical assembly for a three-dimensional measurement device described in configuration 7,
in which the flexible heater is attached to the lens support part using an adhesive tape (256 or 356) having a high thermal conductivity.
[Configuration 9]
The optical assembly for a three-dimensional measurement device described in any of configurations 1 to 8,
in which the optical device is composed of a pattern lighting forming element (241 or 244) that forms pattern lighting, and
the optical lens is composed of a light projection lens (220) for forming an image of a projection pattern by projecting the pattern lighting onto a subject disposed on the other of the pair of conjugate planes.
[Configuration 10]
The optical assembly for a three-dimensional measurement device described in configuration 9,
in which the constant temperature is a temperature equal to or higher than a highest temperature that the light projection lens is able to reach when the heater does not heat the light projection lens within a range of a surrounding environment temperature in which use of the optical assembly for a three-dimensional measurement device is allowed and lower than or equal to an upper limit of an operation-guaranteed temperature of the pattern lighting forming element. [Configuration 11]

The optical assembly for a three-dimensional measurement device described in any of configurations 1 to 8, in which the optical device is composed of an image sensor (341) that has a focal plane, and the optical lens is composed of a light receiving lens (320) for forming, on the focal plane, an image of a projection pattern projected onto a subject disposed on the other of the pair of conjugate planes.

[Configuration 12]

The optical assembly for a three-dimensional measurement device described in configuration 11, in which the constant temperature is a temperature equal to or higher than a highest temperature that the light receiving lens is able to reach when the heater does not heat the light receiving lens within a range of a surrounding environment temperature in which use of the optical assembly for a three-dimensional measurement device is allowed and lower than or equal to an upper limit of an operation-guaranteed temperature of the image sensor.

[Configuration 13]

A three-dimensional measurement device, including the optical assembly for a three-dimensional measurement device described in configuration 9 or 10 as a projection part (12); and the optical assembly for a three-dimensional measurement device described in configuration 11 or 12 as an imaging part (13).

M. Other Embodiments, Etc.

Although the case in which the present disclosure is applied to a three-dimensional measurement device with a single projection part and a single imaging part and an optical assembly for a three-dimensional measurement device provided in the same has been exemplified in the above-described embodiment, an application range of the present disclosure is not limited to such type of device and assembly. That is, the present disclosure can be applied to all of a three-dimensional measurement device with a single projection part and multiple imaging parts, a three-dimensional measurement device with multiple projection parts and a single imaging part, a three-dimensional measurement device with multiple projection parts and imaging parts, and further to optical assemblies for a three-dimensional measurement device provided in the above-described three-dimensional measurement devices.

In addition, although the case in which the unique code method is applied to the three-dimensional measurement device has been exemplified in the above-described embodiment, a random dot method, a phase shift method, a spatial code method, or the like may also be applied to the three-dimensional measurement device. The present disclosure can also be applied to all of such three-dimensional measurement devices and an optical assembly for a three-dimensional measurement device provided in the same, and the application is not limited to a three-dimensional measurement device to which the unique code method is applied to and an optical assembly for a three-dimensional measurement device provided in the same.

In addition, although the case in which the three-dimensional measurement device is used to measure a three-dimensional shape of a workpiece transported on a conveyor has been exemplified in the above-described embodiment for a use application of the three-dimensional measurement device, the present disclosure can of course be applied to a three-dimensional measurement device for various use applications and an optical assembly for a three-dimensional measurement device provided in the same.

Here, as other use applications, for example, a use application in which, when individual workpieces in a bulk state are to be picked up using a robot hand, three-dimensional shapes of the workpieces in the bulk state are measured to recognize individual three-dimensional positions, postures, and the like of the workpieces, and the like can be exemplified.

In addition, although the three-dimensional measurement device that projects a projection pattern onto a subject using light with a specific wavelength has been exemplified as a three-dimensional measurement device in the above-described embodiment, the present disclosure can of course be applied to a three-dimensional measurement device that projects a projection pattern on to a subject using light with multiple wavelengths or using white light.

In addition, although the case in which so-called S-Mount is employed as a lens fixing method has been exemplified in the above-described embodiment, the present disclosure can of course be applied to a case in which another lens fixing method represented by C-Mount is employed.

In addition, although the case in which an LED is used as a light source of the pattern lighting forming element provided in the projection part has been exemplified in the above-described embodiment, other light sources, for example, a laser diode (LD), a mercury lamp, and the like can be used as the light source. In addition, for example, a combination of the above-described light source and a liquid crystal device, a combination of the above-described light source and a micro-mirror array, an organic electro-luminescence (EL), and the like can be used as the pattern lighting forming element.

In addition, although it is preferable to set a temperature of the light projection lens to be kept constant by the control part (a set temperature of the light projection lens) to a temperature lower than or equal to the upper limit of the operation-guaranteed temperature of the pattern lighting forming element provided in the optical assembly for a three-dimensional measurement device as the projection part including the light projection lens and to set a temperature of the light receiving lens to be kept constant by the control part (a set temperature of the light receiving lens) to a temperature lower than or equal to the upper limit of the operation-guaranteed temperature of the image sensor provided in the optical assembly for a three-dimensional measurement device as the imaging part including the light receiving lens as described above in the above-described embodiment, the set temperature of the light projection lens and the set temperature of the light receiving lens may be equal to or different from each other. Here, if these set temperatures are set to be equal to each other, it is preferable to set a lower temperature between the upper limit of the operation-guaranteed temperature of the pattern lighting forming element and the upper limit of the operation-guaranteed temperature of the image sensor as a set temperature. With this configuration, a three-dimensional measurement device with a longer life and higher reliability can be obtained.

Furthermore, although the case in which the heaters are provided in each of the projection part and the imaging part to locally heat a part of the projection part and a part of the imaging part has been exemplified in the above-described embodiment, a heater may be installed in the internal space of the housing without providing the cover members in the projection part and the imaging part so that the entire inside of the housing is heated by the heater.

Meanwhile, it is also conceivable as a relevant embodiment that a cooling means such as a Peltier element is provided in each of the projection part and the imaging part, or a cooling means such as a Peltier element is installed in the internal space of the housing without providing the cover members in the projection part and the imaging part, and the control part performs control of driving the cooling means to keep the light projection lens and the light receiving lens at room temperature. With this configuration, a wide measurement range can be secured in a specified temperature range as in the above-described embodiment.

The above-described embodiment disclosed herein is an example in all aspects and is not limitative. The technical scope of the present invention is defined by the claims, and all modifications within the meaning and scope equivalent to those of the claims are included.

The invention claimed is:

1. A three-dimensional measurement device, comprising an optical assembly serving as a projection part and another optical assembly serving as an imaging part, wherein
the optical assembly and the another optical assembly each comprises:
an optical lens configured to form a pair of conjugate planes having an optically conjugate relationship;
an optical device that is disposed on one of the pair of conjugate planes and located at a focus position of the optical lens;
a temperature sensor configured to detect a temperature of the optical lens;
a heater configured to heat the optical lens;
a control part configured to control an operation of the heater based on a detection result of the temperature sensor such that the optical lens has a constant temperature; and
a lens support part configured to surround the optical lens in a direction orthogonal to an optical axis of the optical lens to support the optical lens, wherein the temperature sensor and the heater are assembled to the lens support part, and
wherein for the optical assembly serving as the projection part, the optical device is composed of a pattern lighting forming element configured to form pattern lighting, and the optical lens is composed of a light projection lens for forming an image of a projection pattern by projecting the pattern lighting onto a subject disposed on the other of the pair of conjugate planes.

2. The optical assembly for a three-dimensional measurement device according to claim 1, further comprising:
a cover member configured to surround the lens support part and cover the temperature sensor and the heater, wherein a thermal conductivity of the cover member is equal to or lower than a thermal conductivity of the lens support part.

3. The three-dimensional measurement device according to claim 2,
wherein the lens support part has a lens barrel configured to support the optical lens and a mount member to which the lens barrel is fixed, and
wherein the cover member has a substantially sealed structure in which the mount member is concealed.

4. The optical assembly for a three-dimensional measurement device according to claim 3,
wherein an air layer is provided in at least a portion between the cover member and the mount member.

5. The three-dimensional measurement device according to claim 1, further comprising:
a base part to which the lens support part is fixed,
wherein a thermal conductivity of the base part is equal to or lower than the thermal conductivity of the lens support part.

6. The three-dimensional measurement device according to claim 1,
wherein the heater is configured as a flexible heater composed of a flexible board on which a heating wire is provided,
wherein the temperature sensor is mounted on the flexible board, and
wherein the flexible heater is disposed on an outer circumferential surface of the lens support part.

7. The three-dimensional measurement device according to claim 6,
wherein the flexible heater is attached to the lens support part using an adhesive tape having a high thermal conductivity.

8. The three-dimensional measurement device according to claim 1,
wherein the constant temperature is a temperature equal to or higher than a highest temperature that the light projection lens is able to reach when the heater does not heat the light projection lens within a range of a surrounding environment temperature in which use of the optical assembly for a three-dimensional measurement device is allowed and lower than or equal to an upper limit of an operation-guaranteed temperature of the pattern lighting forming element.

9. The three-dimensional measurement device according to claim 1,
wherein for the another optical assembly serving as the imaging part, the optical device is composed of an image sensor that has a focal plane, and
wherein the optical lens is composed of a light receiving lens for forming, on the focal plane, an image of a projection pattern projected onto a subject disposed on the other of the pair of conjugate planes.

10. The three-dimensional measurement device according to claim 9,
wherein the constant temperature is a temperature equal to or higher than a highest temperature that the light receiving lens is able to reach when the heater does not heat the light receiving lens within a range of a surrounding environment temperature in which use of the another optical assembly serving as the imaging part is allowed and lower than or equal to an upper limit of an operation-guaranteed temperature of the image sensor.

* * * * *